United States Patent
Kawai et al.

(10) Patent No.: US 10,240,457 B2
(45) Date of Patent: Mar. 26, 2019

(54) MINE MANAGEMENT SYSTEM

(71) Applicant: Komatsu Ltd., Tokyo (JP)

(72) Inventors: Kazunari Kawai, Tokyo (JP); Shinichi Terada, Tokyo (JP); Taito Fujita, Tokyo (JP); Yuichi Kodama, Tokyo (JP); Masaaki Uetake, Tokyo (JP)

(73) Assignee: Komatsu Ltd., Tokyo (JP)

( * ) Notice: Subject to any disclaimer, the term of this patent is extended or adjusted under 35 U.S.C. 154(b) by 64 days.

(21) Appl. No.: 15/300,375

(22) PCT Filed: Feb. 6, 2015

(86) PCT No.: PCT/JP2015/053429
§ 371 (c)(1),
(2) Date: Sep. 29, 2016

(87) PCT Pub. No.: WO2015/151583
PCT Pub. Date: Oct. 8, 2015

(65) Prior Publication Data
US 2017/0138193 A1    May 18, 2017

(30) Foreign Application Priority Data
Mar. 31, 2014 (JP) ................. 2014-074559

(51) Int. Cl.
E21C 41/22    (2006.01)
E21C 35/24    (2006.01)
(Continued)

(52) U.S. Cl.
CPC .............. E21C 41/16 (2013.01); E21C 35/24 (2013.01); E21C 37/00 (2013.01); E21C 41/22 (2013.01);
(Continued)

(58) Field of Classification Search
CPC .......... E21C 41/16; E21C 35/24; E21C 41/22; E21F 13/00; E21F 13/02; E21F 13/025;
(Continued)

(56) References Cited

U.S. PATENT DOCUMENTS 7,899,599 B2   3/2011   Makela et al.
8,437,924 B2   5/2013   Greiner et al.
(Continued)

FOREIGN PATENT DOCUMENTS

| JP | 2007-144255 A | 6/2007 |
| JP | 2011-220104 A | 11/2011 |
| WO | 2013130745 A2 | 9/2013 |

OTHER PUBLICATIONS

Office Action dated Jan. 23, 2017, issued for the Australian patent application No. 2015241937.
(Continued)

*Primary Examiner* — David J Bagnell
*Assistant Examiner* — Michael A Goodwin
(74) *Attorney, Agent, or Firm* — Locke Lord LLP

(57) ABSTRACT

A mine management system includes a carrying machine that is loaded with ore and travels from a mining area to an earth removal area in underground of a mine, a loading machine that mines ore in the mining area and loads the ore onto the carrying machine, and a management device that sets a work mode in the underground based on an input signal, and changes a work parameter of the carrying machine and a work parameter of the loading machine.

5 Claims, 18 Drawing Sheets

(51) Int. Cl.
*E21F 13/00* (2006.01)
*E21C 41/16* (2006.01)
*G06Q 50/02* (2012.01)
*E21C 37/00* (2006.01)
*E21F 13/02* (2006.01)
*G06Q 10/06* (2012.01)

(52) U.S. Cl.
CPC ............ *E21F 13/00* (2013.01); *E21F 13/025* (2013.01); *G06Q 10/0631* (2013.01); *G06Q 50/02* (2013.01); *G05D 2201/021* (2013.01)

(58) Field of Classification Search
CPC ... E21F 13/06; E21F 13/063; G05D 2201/021
USPC .................. 701/50, 53, 54, 55, 56, 110, 123
See application file for complete search history.

(56) References Cited

U.S. PATENT DOCUMENTS

| | | | | |
|---|---|---|---|---|
| 2007/0027612 | A1* | 2/2007 | Barfoot | G08G 1/20 701/117 |
| 2010/0114404 | A1* | 5/2010 | Donnelly | B61D 3/16 701/2 |
| 2012/0136524 | A1 | 5/2012 | Everett et al. | |
| 2013/0054133 | A1* | 2/2013 | Lewis | G01C 21/3407 701/423 |
| 2014/0358382 | A1* | 12/2014 | Kou | E21C 47/00 701/50 |
| 2015/0057886 | A1* | 2/2015 | Larsson | G08G 1/166 701/41 |
| 2015/0269789 | A1* | 9/2015 | Yamagata | G07C 5/008 701/24 |
| 2016/0333690 | A1* | 11/2016 | Puura | G01S 17/42 |
| 2017/0037725 | A1* | 2/2017 | Uotila | E21B 7/025 |

OTHER PUBLICATIONS

International Search Report dated Apr. 28, 2015, issued for PCT/JP2015/053429.

* cited by examiner

MINE MANAGEMENT SYSTEM

FIELD

The present invention relates to a mine management system.

BACKGROUND

As mining methods in mines, a surface mining where mining is performed from the surface of the earth and an underground mining where mining is performed from the underground are known. In recent years, the underground mining has been increasingly employed due to a decrease in a load to the environment and existence of ore in deeper places. For example, Patent Literature 1 describes a working machine, which is a vehicle that excavates ore with a bucket, enters a roadway and excavates the ore, and is then moved in the roadway in a state of holding the excavated ore in the bucket.

CITATION LIST

Patent Literature

Patent Literature 1: U.S. Pat. No. 7,899,599

SUMMARY

Technical Problem

In mines, work in a production system based on various indexes has been demanded.

An objective of forms of the present invention is to provide a mine management system that enables smooth work in an on-demand production system.

Solution to Problem

According to an aspect of the present invention, a mine management system comprises: a carrying machine configured to be loaded with ore and travel from a mining area in underground of a mine to an earth removal area; a loading machine configured to mine the ore in the mining area and load the ore onto the carrying machine; and a management device configured to set a work mode in the underground based on an input signal, and change a work parameter of the carrying machine and a work parameter of the loading machine.

Advantageous Effects of Invention

According to forms of the present invention, work can be smoothly performed in an on-demand production system.

DESCRIPTION OF EMBODIMENTS

Hereinafter, embodiments according to the present invention will be described with reference to the drawings. However, the present invention is not limited thereto. In the following description, positional relationships among units and portions will be appropriately described, where one direction in a predetermined plane is an X axis direction, a direction perpendicular to the X axis direction in the predetermined plane is a Y axis direction, and a direction perpendicular to the X axis direction and the Y axis direction is a Z axis direction. Further, a direction of action of gravity is a downward side and an opposite direction to the direction of action of gravity is an upward side.

Productivity of a mine includes a mining cost per unit weight of ore to be mined ($/t) and a mining amount of ore per unit time (t/h). t is a mining amount, h is a time, and $ is a cost.

<Outline of Mining Site>

Figure 1:
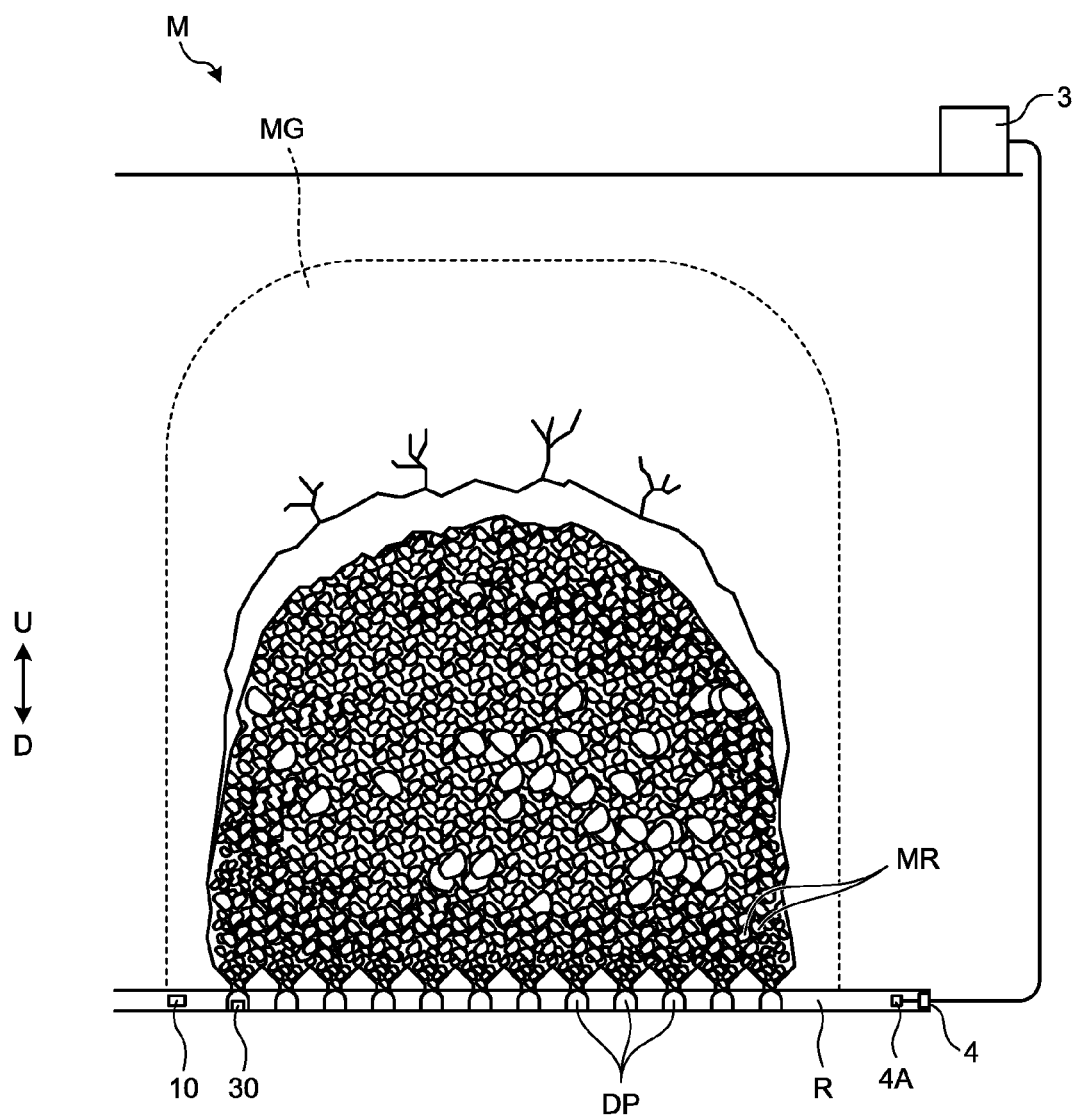
FIG. 1 is a schematic diagram illustrating an example of a site where a carrying machine and a loading machine according to the present embodiment are operated.

FIG. 1 is a schematic diagram illustrating an example of a site where a carrying machine 10 and a loading machine 30 according to the present embodiment are operated. The carrying machine 10 and the loading machine 30 are used in underground mining where ore is mined from the underground. The carrying machine 10 is one type of working machines that carry a load in a roadway R, and the loading machine 30 is one type of working machines that load the carrying machine 10. In the present embodiment, the ore is mined by a block caving method.

The block caving method refers to a method for installing a mining area (draw point) DP of ore MR in an orebody (mine vein) MG of a mine M and the roadway R through which the mined ore MR is conveyed, undercutting and blasting an upper portion of the draw point DP, allowing the ore MR to spontaneously fall, and mining the ore MR from the draw point DP. The draw point DP is installed inside or below the orebody MG. The block caving method is a method using a characteristic that fragile rocks start spontaneously falling when a lower portion of bedrock or an orebody is undercut. When the ore MR is mined from an inside or below the orebody MG, the falling propagates to an upper portion. Therefore, by use of the block caving method, the ore MR of the orebody MG can be efficiently mined. In the block caving method, a plurality of the draw points DP is often provided.

In the present embodiment, a management device 3 is arranged on the ground. The management device 3 is installed in a management facility on the ground. In principle, movement of the management device 3 is not taken into account. The management device 3 manages the mining site. The management device 3 can perform communication with the underground working machines including the carrying machine 10 and the loading machine 30 through a communication system including a wireless communication device 4 and an antenna 4A. In the present embodiment, the carrying machine 10 and the loading machine 30 are working machines operated unmanned. Note that the carrying machine 10 and the loading machine 30 may be manned working machines operated by operations of operators.

<Underground>

Figure 2:
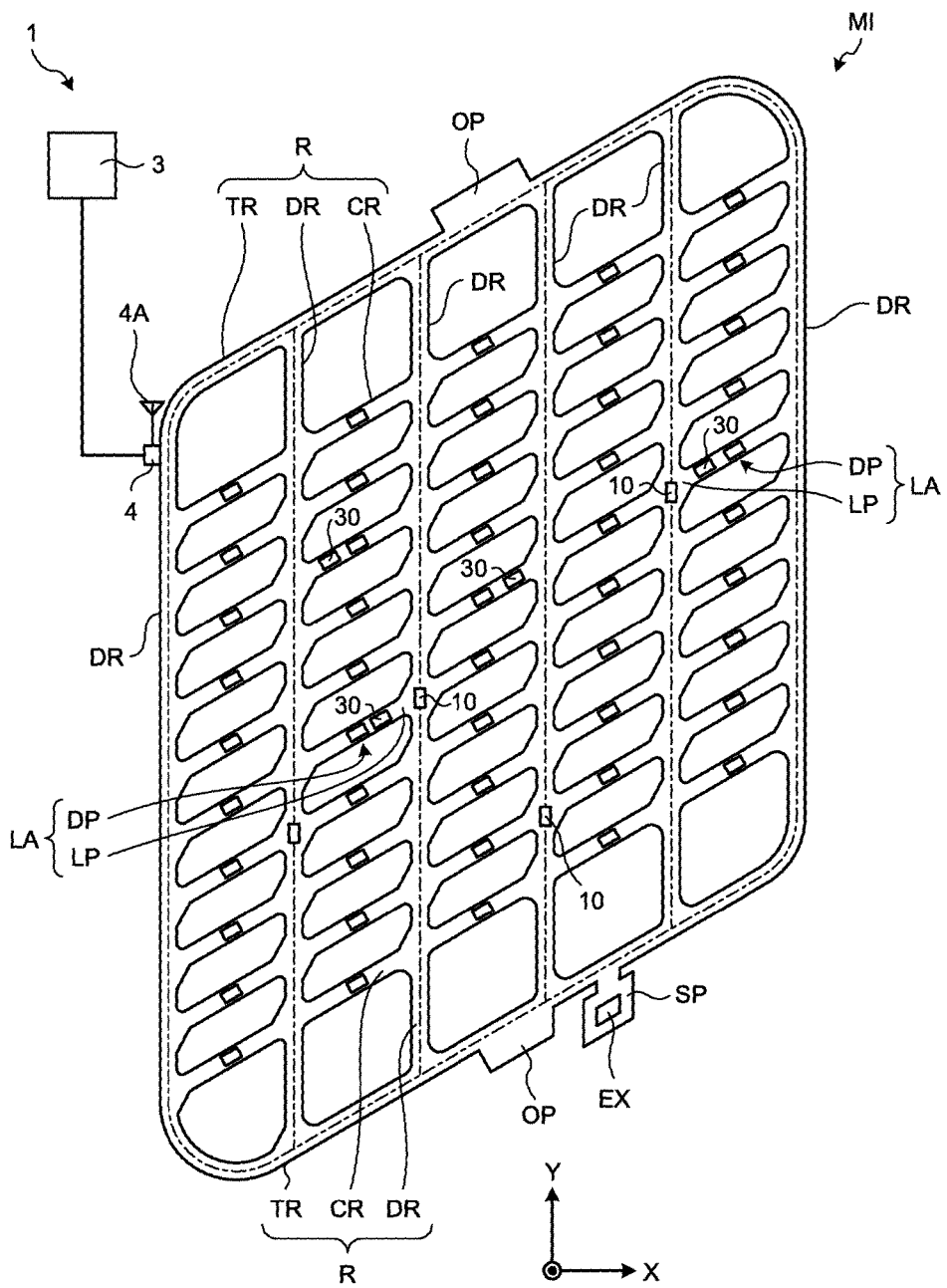
FIG. 2 is a schematic view illustrating an example of underground and a mine mining system.
Figure 3:
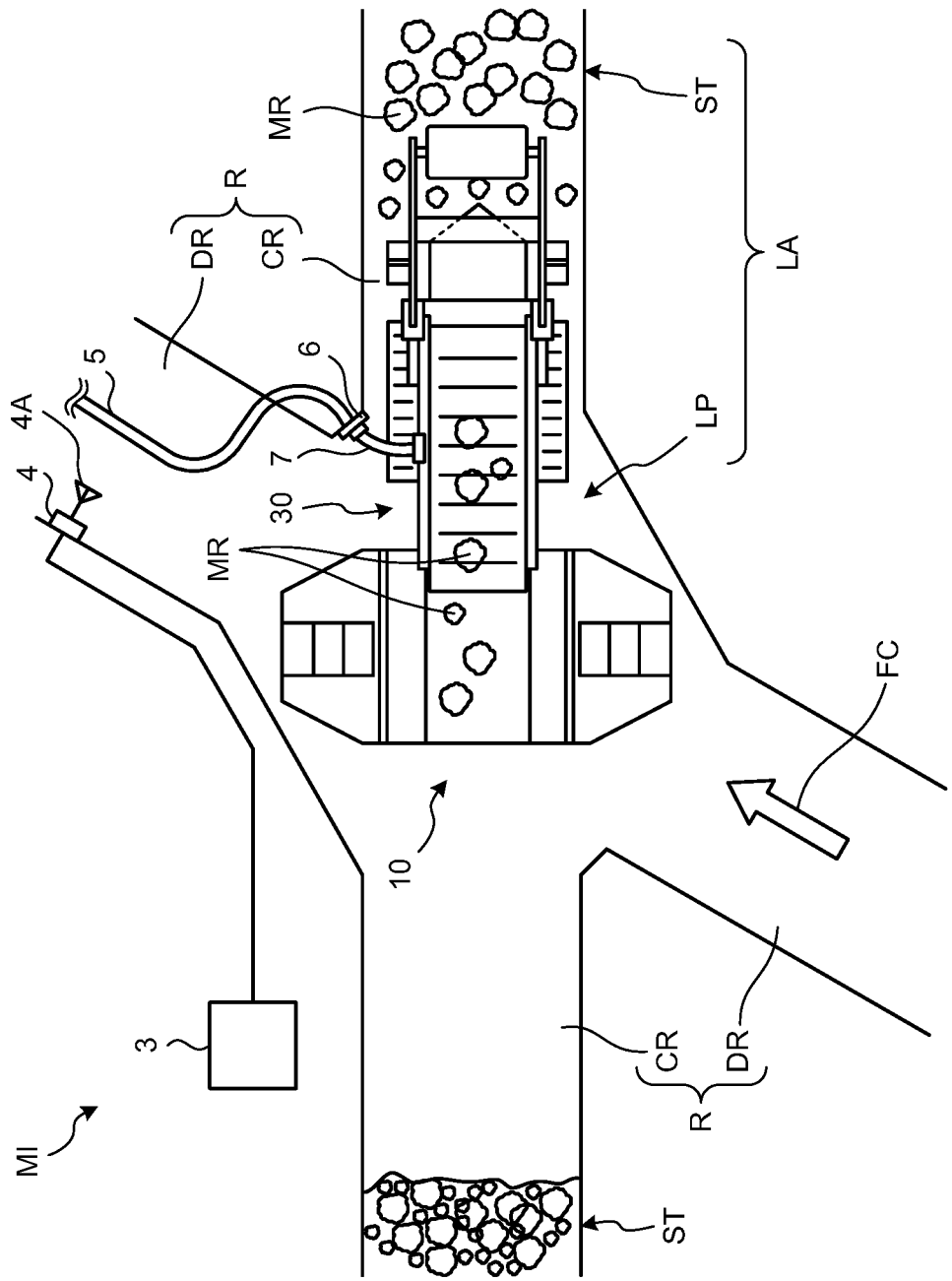
FIG. 3 is a partially enlarged diagram of FIG. 2.

FIG. 2 is a schematic diagram illustrating an example of underground MI and a management system 1 of a mine according to the present embodiment. FIG. 3 is a partially enlarged diagram of FIG. 2. As illustrated in FIGS. 2 and 3, the roadway R installed below a mine vein MG includes a first roadway DR and a second roadway CR. The roadway R is installed inside the orebody MG or below the orebody M, for example. In the underground MI, a plurality of the first roadways DR and the second roadways CR exist. The second roadway CR connects the draw points DP and the first roadways DR. The loading machine 30 can pass through the second roadway CR and approach the draw point DP. In the present embodiment, the roadway R includes a third roadway TR. In the present embodiment, a plurality of (two in this example) third roadways TR is connected with the plurality of first roadways DR. In the following description, the first roadway DR is appropriately referred to as drift DR, the second roadway CR is appropriately referred to as cross cut CR, and the third roadway TR is appropriately referred to as outer peripheral road TR.

As illustrated in FIG. 2, the two outer peripheral roads TR are installed in the underground MI. The cross cuts CR are divided by the draw points DP. The outer peripheral roads TR are not divided by the draw points DP. One outer peripheral road TR connects respective one end portions of the plurality of drifts DR, the other one outer peripheral road TR connects respective the other end portions of the plurality of drifts DR. As described above, all of the drifts DR are connected with the two outer peripheral roads TR. In the present embodiment, the carrying machine 10 and the loading machine 30 can enter any of the drifts DR from one of the outer peripheral roads TR. In the example illustrated in FIG. 3, the carrying machine 10 and the loading machine 30 proceed in the drift DR toward the direction of the arrow FC.

As illustrated in FIGS. 2 and 3, a loading position LP where loading work by the loading machine 30 to the carrying machine 10 is determined in the cross cut CR or its vicinity. In the following description, an area including the draw point DP and the loading position LP is appropriately referred to as loading area LA.

As illustrated in FIG. 2, the underground MI is provided with an earth removal area (ore path) OP where the ore MR as a load carried by the carrying machine 10 is discharged. The carrying machine 10 is loaded with the ore MR as a load by the loading machine 30 in the loading area LA near the draw point DP, then travels in the drift DR, and is moved to the ore path OP. The carrying machine 10 discharges the ore MR as a load to the ore path OP where the carrying machine 10 has arrived.

In the present embodiment, the carrying machine 10 includes a travel motor and a storage battery that supplies power to the motor. A space SP is connected to the outer peripheral road TR. In the space SP, a storage battery replacing device EX that replaces a storage battery mounted on the carrying machine 10.

In the following description, for convenience, a road surface of the roadway R where the carrying machine 10 travels and the XY plane are substantially parallel. Note that, in reality, the road surface of the roadway R may have unevenness, or an upslope and a downslope.

As illustrated in FIG. 2, the mine management system 1 includes the management device 3 and the wireless communication antenna 4A. The management device 3 manages operations of the carrying machine 10 and the loading machine 30 operated in the underground MI, for example. The management of the operations includes allocation of the carrying machine 10 and the loading machine 30, collection of information (operation information) regarding operation states of the carrying machine 10 and the loading machine 30, and its management. The operation information includes, for example, operation times of the carrying machine 10 and the loading machine 30, travel distance, travel speed, a residual amount of the storage battery, existence or non-existence of abnormality, a place of the abnormality, and a loading amount. The operation information is mainly used for drive evaluation of the carrying machine 10 and the loading machine 30, preventive maintenance, and abnormality diagnosis. Therefore, the operation information is useful to meet needs such as enhancement of productivity of the mine M and improvement of operation of the mine.

The management device 3 includes a communication device. The wireless communication device 4 including the antenna 4A is connected with the communication device of the management device 3. The management device 3 can transmit information to the carrying machine 10 and the loading machine 30 operated in the underground MI through the communication device, the wireless communication device 4, and the antenna 4A.

In the present embodiment, the loading machine 30 travels by the travel motor, and drives a scooping device by a motor to excavate the ore MR. As illustrated n FIG. 3, a feed cable 5 that supplies power from an outside of the loading machine 30 to these motors is provided in the roadway R in the underground MI. The loading machine 30 receives supply of power from the feed cable 5 through a feed connector 6 as a power supply device and a power cable 7 extending from the loading machine 30 provided in the loading area LA, for example. The power supply device may just be provided in one of the drift DR and the cross cut CR. In the present embodiment, the loading machine 30 may perform at least one of traveling or excavation by the power supplied from an outside. Further, the loading machine 30 may mount a storage battery, and perform at least one of the traveling and the excavation upon receipt of supply of power from the storage battery. Further, the loading machine 30 may mount a storage battery, and perform at least one of the traveling and the excavation upon receipt of supply of power from the storage battery. That is, the loading machine 30 performs at least one of the traveling and the excavation by at least one of the power supplied from an outside and the power supplied from the storage battery. For example, the loading machine 30 can perform the excavation by the power supplied from an outside and can travel by the power supplied from the storage battery. Further, when traveling in the cross cut CR, the loading machine 30 may travel by the power supplied from an outside. In the present embodiment, the loading machine 30 drives a hydraulic pump by the motor to generate hydraulic pressure, and drives a hydraulic motor by the hydraulic pressure, thereby to excavate the ore MR. Further, the loading machine 30 may include a storage battery, and perform the traveling and excavation by the power supplied from the storage battery.

Connection between the feed cable 5 and the power cable 7 extending from the loading machine 30 is not limited to the connector 6. For example, an electrode provided at the roadway R side and connected to the feed cable 5 and an electrode connected to the power cable 7 from the loading machine 30 side are used as the power supply device and both of the electrodes are in contact with each other, and the power may be supplied through the feed cable 5 to the loading machine 30. In doing so, even if positioning accuracy of both of the electrodes is low, the electrodes can be in contact with each other and the power can be supplied to the loading machine 30. In the present embodiment, the loading machine 30 is operated by the power. However, the loading machine 30 is not limited thereto. The loading machine 30 may travel or excavate the ore MR by an internal-combustion engine, for example. In this case, the loading machine 30 may drive a hydraulic pump by the internal-combustion engine, and travel or excavate the ore MR by driving a hydraulic motor or a hydraulic cylinder by a hydraulic oil ejected by the hydraulic pump, for example.

<Excavation and Carrying of Ore>

Figure 4:
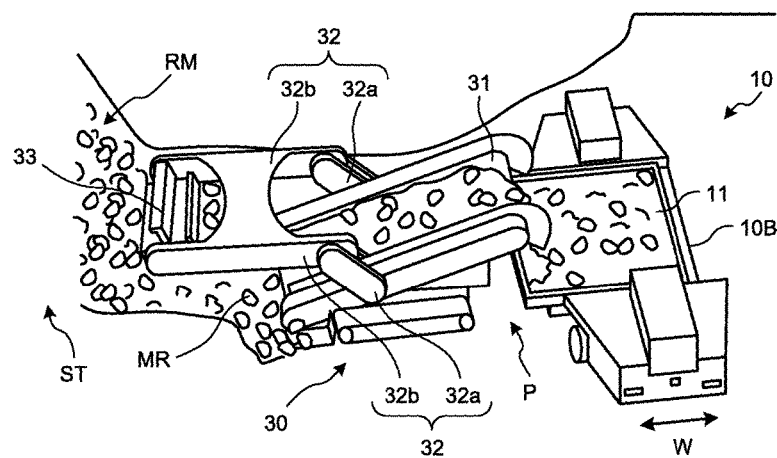
FIG. 4 is a diagram illustrating excavation of ore of a rock mass and loading of the ore to the carrying machine by the loading machine.
Figure 5:
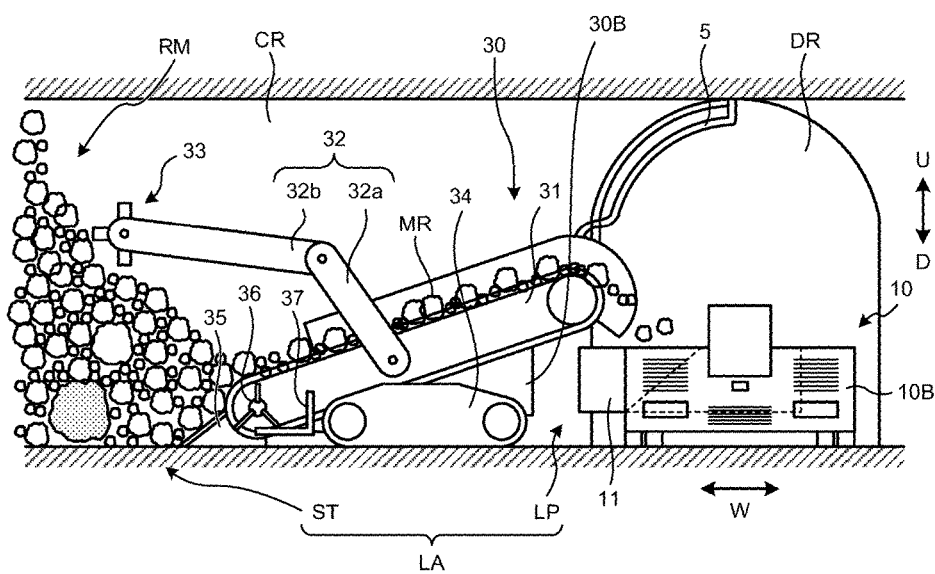
FIG. 5 is a diagram illustrating excavation of ore of a rock mass and loading of the ore to the carrying machine by the loading machine.

FIGS. 4 and 5 are diagrams illustrating excavation of the ore MR of the rock mass RM and loading of the ore MR to the carrying machine 10 by the loading machine 30. At the draw point DP of the loading area LA, the rock mass RM of the ore MR is formed. As illustrated in FIGS. 4 and 5, the loading machine 30 is installed in the cross cut CR of the loading area LA, and a tip end portion thereof intrudes into the rock mass RM of the ore MR, and excavates the ore MR. The loading machine 30 loads the excavated ore MR onto the carrying machine 10 waiting at an opposite side to the rock mass RM in the drift DR. In the drift DR, the feed cable 5 that supplies the power to the loading machine 30 is provided.

As illustrated in FIGS. 4 and 5, the loading machine 30 includes a vehicle body 30B, a feeder 31 as a conveying device, a rotation roller 33 as an excavation device, a support mechanism 32 that supports the rotation roller 33, and a traveling device 34. The rotation roller 33 and the support mechanism 32 function as a scooping device that excavates the ore MR and sends the ore MR to the feeder 31.

The support mechanism 32 includes a boom 32a attached to the vehicle body 30B, and an arm 32b that is connected with the boom 32a and swings, and rotatably supports the rotation roller 33. The vehicle body 30B of the loading machine 30 includes an intruding member 35 that intrudes into the rock mass RM of the ore MR, a rotation body 36, and a rock guard 37. The intruding member 35 intrudes into the rock mass RM at the time of excavation of the ore MR. The rotation body 36 is rotated when the intruding member 35 of the loading machine 30 intrudes into the rock mass RM, and supports the intrusion.

The carrying machine 10 includes a vehicle body 10B and a vessel 11. The vessel 11 is mounted on the vehicle body 10B. The vessel 11 is loaded with the ore MR as a load. In the present embodiment, as illustrated in FIGS. 4 and 5, the vessel 11 is moved in a width direction W of the vehicle body 10B, that is, a direction parallel to an axle. The vessel 11 is installed in the center in the width direction of the vehicle body 10B at the time of traveling of the carrying machine 10. Further, the vessel 11 is moved outside in the width direction of the vehicle body 10B at the time of loading the ore MR. As a result, the carrying machine 10 can allow the vessel 11 to come close to a downward side D of the feeder 31 of the loading machine 30. Therefore, the carrying machine 10 can decrease a possibility that the ore MR conveyed by the feeder 31 drops outside the vessel 11, and can allow the ore MR to reliably drop in the vessel 11.

In the present embodiment, the loading machine 30 excavates the ore MR at the draw point (mining area) DP in the underground MI of the mine M, and conveys and loads the ore MR mined at the draw point DP onto the carrying machine 10. The carrying machine 10 is loaded with the ore MR and travels from the draw point DP to the ore path (earth removal area) OP in the underground MI. After carrying the ore MR to the ore path OP, the carrying machine 10 discharges the ore MR to the ore path OP. At this time, the loading machine 30 stays in the cross cut CR in a state of leaving a space where the carrying machine 10 travels in the drift DR, and excavates the ore MR at the draw point DP. Then, the loading machine 30 conveys the excavated ore MR in a direction of being away from the draw point DP, and loads the ore MR onto the carrying machine 10. The loading machine 30 does not move in a state of being loaded with the excavated ore MR. The carrying machine 10 is loaded with the ore MR mined at the draw point DP, travels in the drift DR, and carries the ore MR to the ore path OP illustrated in FIG. 2.

As described above, in the present embodiment, the mine management system 1 separates the functions of the loading machine 30 and the carrying machine 10 by causing the loading machine 30 to perform only the excavation and loading of the ore MR, and causing the carrying machine 10 to perform only the carrying of the ore MR. Therefore, the loading machine 30 can be dedicated to excavation work and conveyance work, and the carrying machine 10 can be dedicated to carrying work. That is, the loading machine 30 may not have the function to carry the ore MR, and the carrying machine 10 may not have the functions to excavate and convey the ore MR. The loading machine 30 can be specialized in the functions of excavation and conveyance, and the carrying machine 10 can be specialized in the function to carry the ore MR, and thus can exhibit the respective functions as much as possible. As a result, the mine management system 1 can enhance the productivity of the mine M.

<Management Device>

Figure 6:
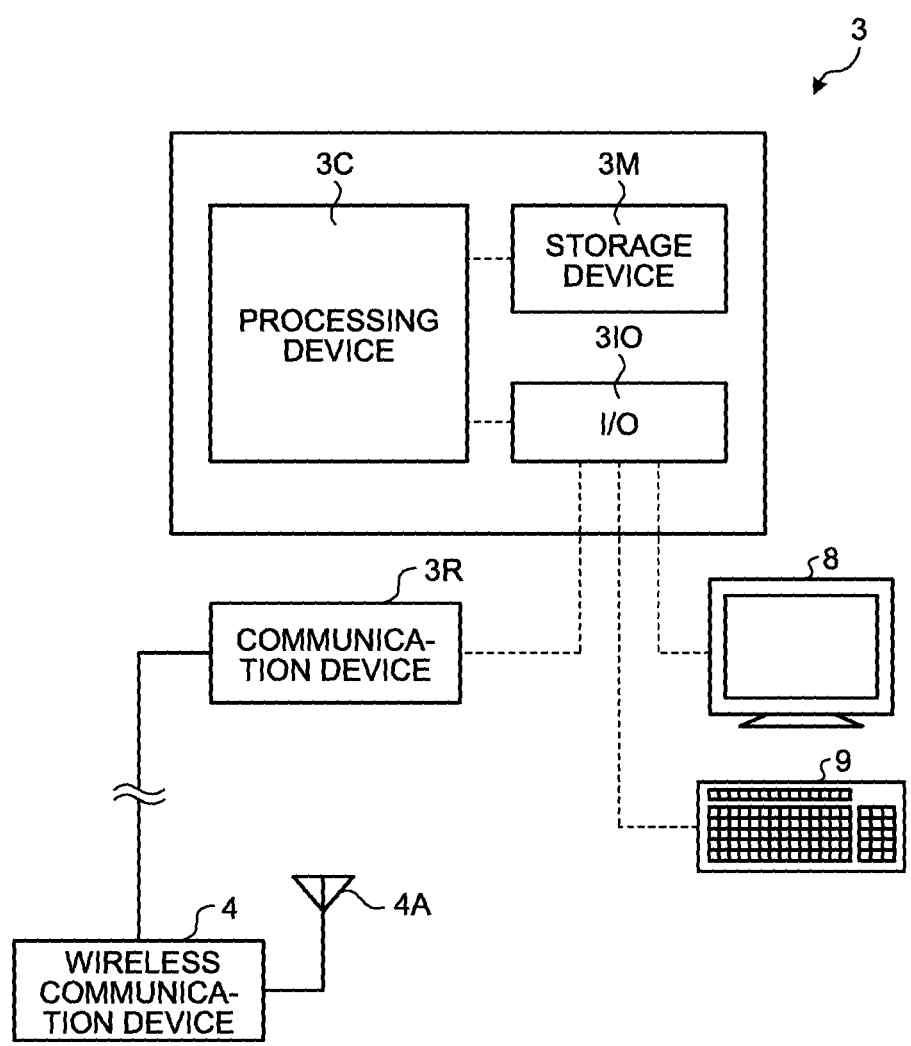
FIG. 6 is an example of a function block diagram of a management device included in the mine management system.

FIG. 6 is a function block diagram illustrating an example of the management device 3 according to the present embodiment. The management device 3 includes a processing device 3C, a storage device 3M, and an input/output unit (I/O) 310. A display device 8 as an output device, an input device 9, and a communication device 3R are connected to the input/output unit 310 of the management device 3. The management device 3 is a computer, for example. The processing device 3C is a central processing unit (CPU), for example. The storage device 3M is a random access memory (RAM), a read only memory (ROM), a flash memory, a hard disk drive, or a combination thereof, for example. The input/output unit 310 is used as an input/output (interface) of information between the processing device 3C, and the display device 8, the input device 9, and the communication device 3R connected to an outside of the processing device 3C.

The processing device 3C executes processing of the management device 3 such as vehicle allocation of the carrying machine 10 and the loading machine 30 and collection of the operation information of the machines. The processing of vehicle allocation, collection of the operation information, and the like is realized such that the processing device 3C reads computer programs corresponding to the respective processing from the storage device 3M and executes the computer programs.

In the present embodiment, the processing device 3C sets a work mode of the underground MI based on an input signal generated by an operation of the input device 9. The management device 3 changes both of a work parameter of the carrying machine 10 and a work parameter of the loading machine 30 based on the set work mode.

The storage device 3M stores various computer programs for allowing the processing device 3C to execute various types of processing. In the present embodiment, the computer programs stored in the storage device 3M are, for example, a computer program for allocating the carrying machine 10 and the loading machine 30, a computer program for collecting the operation information of the carrying machine 10 and the loading machine 30, and a computer program that realizes various analyses based on the operation information, and the like.

The display device 8 is a liquid crystal display, for example, and displays necessary information in allocating the carrying machine 10 and the loading machine 30 and collecting the operation information. The input device 9 is a keyboard, a touch panel, or a mouse, for example, and inputs necessary information in allocating the carrying machine 10 and the loading machine 30 and collecting the operation information. The communication device 3R is connected with the wireless communication device 4 including the antenna 4A. As described above, the wireless communication device 4 and the antenna 4A are installed in the underground MI. The communication device 3R and the wireless communication device 4 are connected by wired means. The communication device 3R and the carrying machine 10 and the loading machine 30 in the underground MI can perform communication by a wireless local area network (LAN), for example. Next, the carrying machine 10 will be described in more detail.

<Carrying Machine>

Figure 7:
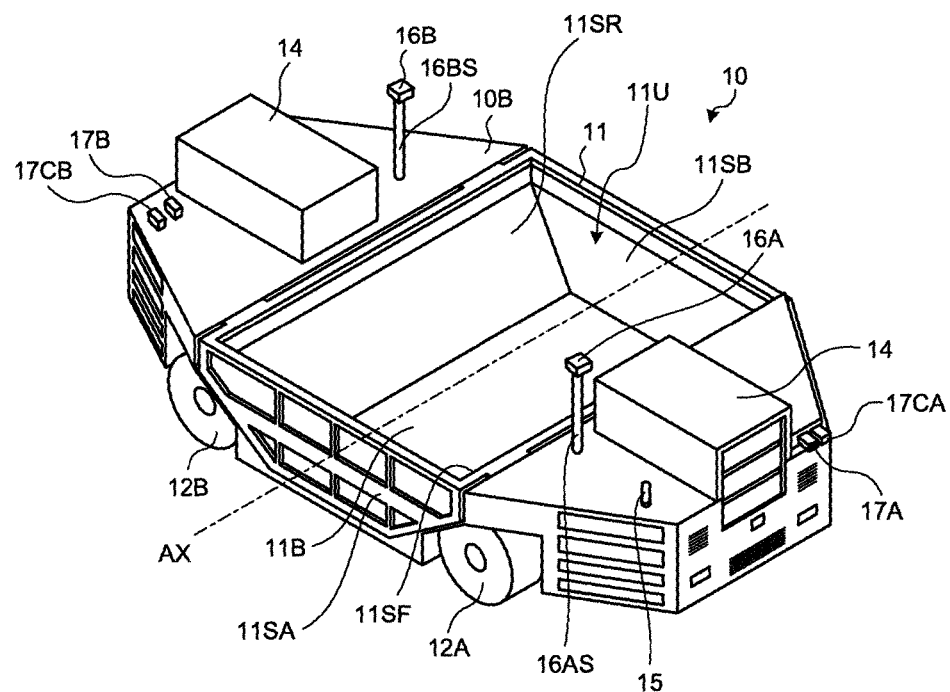
FIG. 7 is a perspective view of the carrying machine according to the present embodiment.
Figure 8:
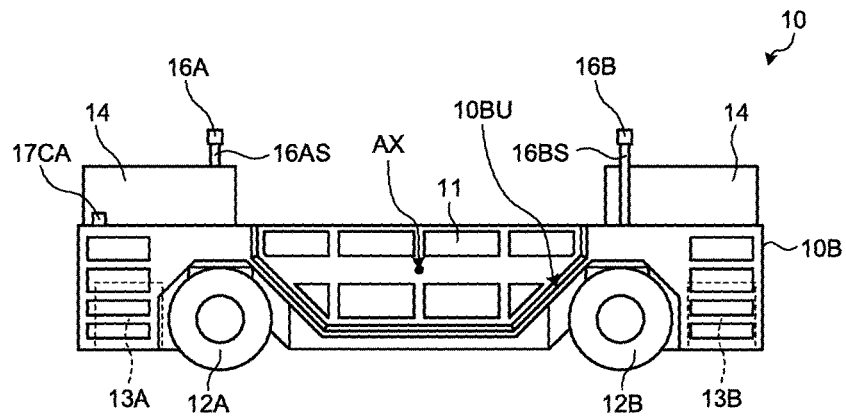
FIG. 8 is a side view of the carrying machine according to the present embodiment.

FIG. 7 is a perspective view illustrating an example of the carrying machine 10 according to the present embodiment. FIG. 8 is a side view of the carrying machine 10 according to the present embodiment. The carrying machine 10 includes the vehicle body 10B, the vessel 11, and wheels 12A and 12B. Further, the carrying machine 10 includes a storage battery 14 as a storage battery, an antenna 15, imaging devices 16A and 16B, and non-contact sensors 17A and 17B. The wheels 12A and 12B are attached to front and rear portions of the vehicle body 10B. In the present embodiment, the wheels 12A and 12B are driven by motors 13A and 13B mounted in the vehicle body 10B, which are illustrated in FIG. 8. As described above, in the carrying machine 10, all of the wheels 12A and 12B serve as driving wheels. Further, in the present embodiment, the wheels 12A and 12B serve as steering wheels. In the present embodiment, the wheels 12A and 12B are, for example, solid tires. With the solid tires, the wheels 12A and 12B can have a small diameter, and thus the height of the carrying machine 10 can be suppressed. The carrying machine 10 can travel both in a direction from the wheels 12A to the wheels 12B and in a direction from the wheels 12B to the wheels 12A. The wheels 12A and 12B are not limited to the solid tires, and may be, for example, tires filled with air. Further, only one of the wheels 12A and 12B may be the driving wheels.

When the carrying machine 10 proceeds where the wheels 12A serve as front wheels and the wheels 12B serve as rear wheels in a case where both of the wheels 12A and the wheels 12B can function as the steering wheels, only the wheels 12A (front wheels) may be steered and the wheels 12B (rear wheels) may not be steered, or only the wheels 12B (rear wheels) may be steered and the wheels 12A (front wheels) may not be steered. Further, both of the wheels 12A (front wheels) and the wheels 12B (rear wheels) may be steered. In a case where both of the wheels 12A and the wheels 12B are steered, the wheels 12A and the wheels 12B may be steered in the same phase directions, or the wheels 12A and the wheels 12B may be steered in opposite phase directions. When the wheels 12A and the wheels 12B are steered in the same phase directions, the carrying machine 10 can stably travel at the time of high-speed swing, for example. When the wheels 12A and the wheels 12B are steered in the opposite phase directions, a swing radius can be made small. The same applies to a case where the carrying machine 10 proceeds where the wheels 12B serve as the front wheels and the wheels 12A serve as the rear wheels.

The vessel 11 is mounted in an upper portion of the vehicle body 10B, and is supported by the vehicle body 10B. In the vehicle body 10B, a storage battery 14 for supplying the power to the motors 13A and 13B is mounted. In the present embodiment, an external form of the storage battery 14 is a rectangular parallelepiped. One storage battery 14 is mounted in the front portion and one storage battery 14 is mounted in the rear portion of the vehicle body 10B, respectively. In doing so, mass of the carrying machine 10 in the front portion and in the rear portion is approximately equally balanced, and thus the carrying machine 10 can stably travel. The storage batteries 14 are detachably mounted to the vehicle body 10B. The motors 13A and 13B and electronic devices included in the carrying machine 10 are operated by the power supplied from the storage batteries 14. In the present embodiment, the carrying machine 10 is electrically driven. However, the internal-combustion engine may be employed as a power source.

The antenna 15, the imaging devices 16A and 16B, and the non-contact sensors 17A and 17B are attached to the vehicle body 10B. The antenna 15 performs wireless communication with the management device 3 through the antenna 4A and the communication device 3R illustrated in FIG. 6. The imaging devices 16A and 16B capture the load loaded on the vessel 11, that is, the state of the ore MR (package) of the ore MR illustrated in FIGS. 3 and 4. The imaging devices 16A and 16B may be, for example, a camera that images visible light, or may be an infrared camera that images an infrared ray. The imaging devices 16A and 16B are respectively attached to tip ends of supporting columns 16AS and 16BS attached to an upper surface of the vehicle body 10B. With such a configuration, the imaging devices 16A and 16B can image the entire vessel 11 from above, and can reliably image the state of the ore MR loaded on the vessel 11.

The non-contact sensors 17A and 17B are respectively attached to a front portion and a rear portion of the vehicle body 10B. The non-contact sensors 17A and 17B detect an object in a periphery of the carrying machine 10, especially in a proceeding direction side, in a non-contact manner. As the non-contact sensors 17A and 17B, for example, radar devices are used. The non-contact sensors 17A and 17B emit electric waves or ultrasonic waves and receive the electric waves reflected at the object, and can detect relative distance and azimuth from the object. The non-contact sensors 17A and 17B are not limited to the radar devices. The non-contact sensors 17A and 17B may include, for example, at least one of laser scanners and three-dimensional distance sensors.

The carrying machine 10 respectively includes peripheral monitoring cameras 17CA and 17CB as imaging devices in front and rear portions of the vehicle body 10B. The peripheral monitoring cameras 17CA and 17CB image a periphery, especially, the front of the vehicle body 10B, and detects the shape of an object existing in the periphery of the vehicle body 10B.

The vehicle body 10B includes a recessed portion 10BU between the front and rear portions. The recessed portion 10BU is arranged between the wheels 12A and the wheels 12B. The vessel 11 is a member loaded with the ore MR as a load by the loading machine 30. At least a part of the vessel 11 is arranged in the recessed portion 10BU.

In the present embodiment, in a front and rear direction of the vehicle body 10B, a part of the vehicle body 10B arranged at one side with respect to a central portion AX of the vehicle body 10B and a part of the vehicle body 10B arranged at the other side with respect to the central portion AX are symmetrical (symmetrical in the front and rear direction). Further, in the front and rear direction of the vehicle body 10B, a part of the vessel 11 arranged at one side with respect to the central portion AX of the vehicle body 10B and a part of the vessel 11 arranged at the other side with respect to the central portion AX are symmetrical (symmetrical in the front and rear direction). Further, the vehicle body 10B and the vessel 11 are symmetrical (symmetrical in a right and left direction) with respect to a central axis of the vehicle body 10B in the front and rear direction in planar view.

The vessel 11 includes a bottom surface 11B, four side surfaces 11SF, 11SR, 11SA, and 11SB connected to the bottom surface 11B. The side surfaces 11SA and 11SB vertically rise from the bottom surface 11B. The side surfaces 11SF and 11SR are respectively inclined toward the wheels 12A and 12B side with respect to the bottom surface 11B. A recessed portion 11U is formed of the bottom surface 11B and the four side surfaces 11SF, 11SR, 11SA, and 11SB. The recessed portion 11U is loaded with the ore MR as a load. The recessed portion 10BU of the vehicle body 10B has a shape corresponding to the external form of the vessel 11.

Figure 9:
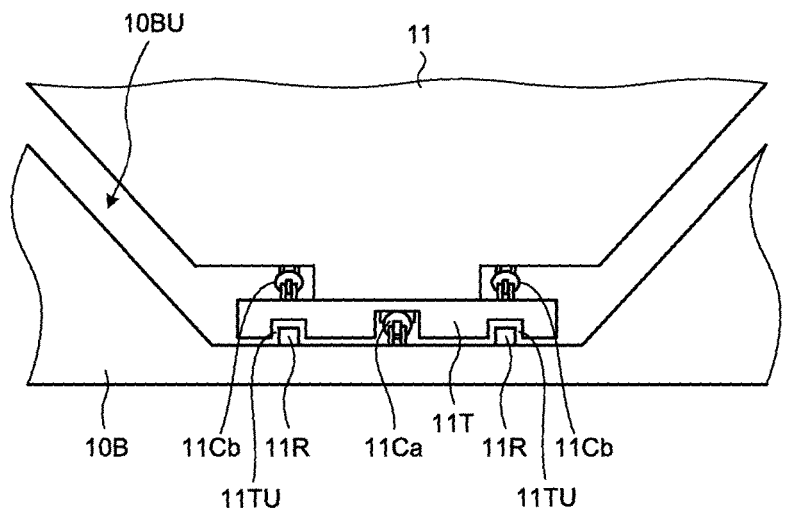
FIG. 9 is a diagram illustrating a support structure of a vessel included in the carrying machine according to the present embodiment.
Figure 10:
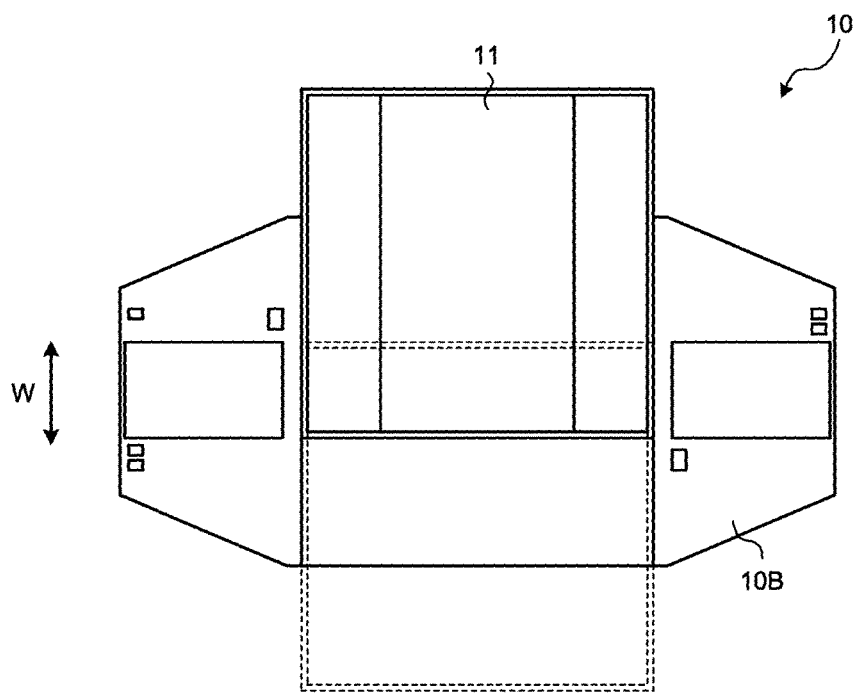
FIG. 10 is a top view of the carrying machine according to the present embodiment.
Figure 11:
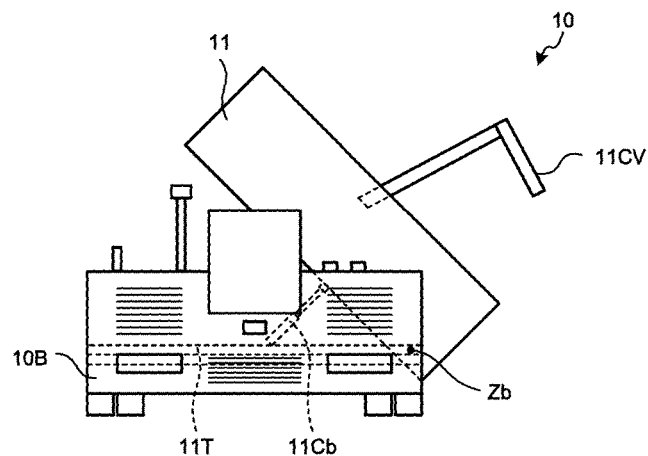
FIG. 11 is a diagram illustrating a state in which the carrying machine according to the present embodiment allows the vessel to be inclined.

FIG. 9 is a diagram illustrating a support structure of the vessel 11 included in the carrying machine 10 according to the present embodiment. FIG. 10 is a top view of the carrying machine 10 according to the present embodiment. FIG. 11 is a diagram illustrating a state in which the carrying machine 10 according to the present embodiment allows the vessel to be inclined. The vessel 11 is placed through a hydraulic cylinder (hoist cylinder) 11Cb as an actuator that lifts and lowers the vessel 11 on a top surface of a table 11T.

The table 11T is supported by the vehicle body 10B through a pair of support bodies 11R and 11R provided on a top surface of the recessed portion 10BU of the vehicle body 10B. The support body 11R is a rod-like member extending in the width direction of the vehicle body 10B. The support bodies 11R and 11R are fit into a pair of grooves 11TU and 11TU provided in portions of the table 11T, the portions facing the vehicle body 10B. The grooves 11TU and 11TU are provided in a direction into which the support body 11R extends, that is, toward the width direction of the vehicle body 10B. With such a structure, the table 11T is moved along the support bodies 11R and 11R. That is, the table 11T can move toward the width direction of the vehicle body 10B of the carrying machine 10.

A hydraulic cylinder (slide cylinder) 11Ca is attached between the table 11T and the vehicle body 10B, as an actuator for moving the table 11T in the width direction of the vehicle body 10B. When the hydraulic cylinder 11Ca expands and contracts, the table 11T is moved toward both sides in the width direction of the vehicle body 10B. Since the vessel 11 is attached to the table 11T, the vessel 11 can also be moved toward both sides of the width direction W of the vehicle body 10B together with the table 11T, as illustrated in FIG. 10.

When the ore MR is loaded onto the vessel 11 from the loading machine 30, the vessel 11 is moved to the loading machine 30 side, as illustrated in FIG. 5. In doing so, the carrying machine 10 can reliably load the ore MR onto the vessel 11. Further, in a case where the ore MR is loaded onto one side of the vessel 11, the carrying machine 10 can disperse the ore MR over the entire vessel 11 and suppress the bias of the ore MR by causing the vessel 11 to perform back-and-forth motion in the width direction of the vehicle body 10B.

The vessel 11 lifts and lowers as a hydraulic cylinder 11Cb expands and contracts. FIG. 11 illustrates a state in which the hydraulic cylinder 11Cb extends and the vessel 11 is inclined. As illustrated in FIG. 11, the vessel 11 swings around an axial line Zb at one side of the vehicle body 10B in the width direction W. The axial line Zb is included in the table 11T, and is parallel to the front and rear direction of the vehicle body 10B. When the hydraulic cylinder 11Cb extends, the vessel 11 becomes high at an opposite side to the axial line Zb, and protrudes from the recessed portion 10BU of the vehicle body 10B. As a result, the vessel 11 is inclined, and a cover 11CV at the axial line Zb side is opened and the ore MR is discharged from the axial line Zb side. When the hydraulic cylinder 11Cb contracts, the vessel 11 is housed in the recessed portion 10BU of the vehicle body 10B. The cover 11CV is moved in conjunction with the lifting and lowering motions of the vessel 11 by a link mechanism (not illustrated).

In the present embodiment, the vessel 11 swings only around the axial line Zb existing at one side in the width direction W of the vehicle body 10B. However, an embodiment is not limited thereto. For example, the vessel 11 may swing around the other axial line existing at the other side and parallel to the front and rear direction of the vehicle body 10B, in addition to the axial line Zb at the one side of the vehicle body 10B. In doing so, the carrying machine 10 can discharge the ore MR from both sides in the width direction W of the vehicle body 10B.

Figure 12:
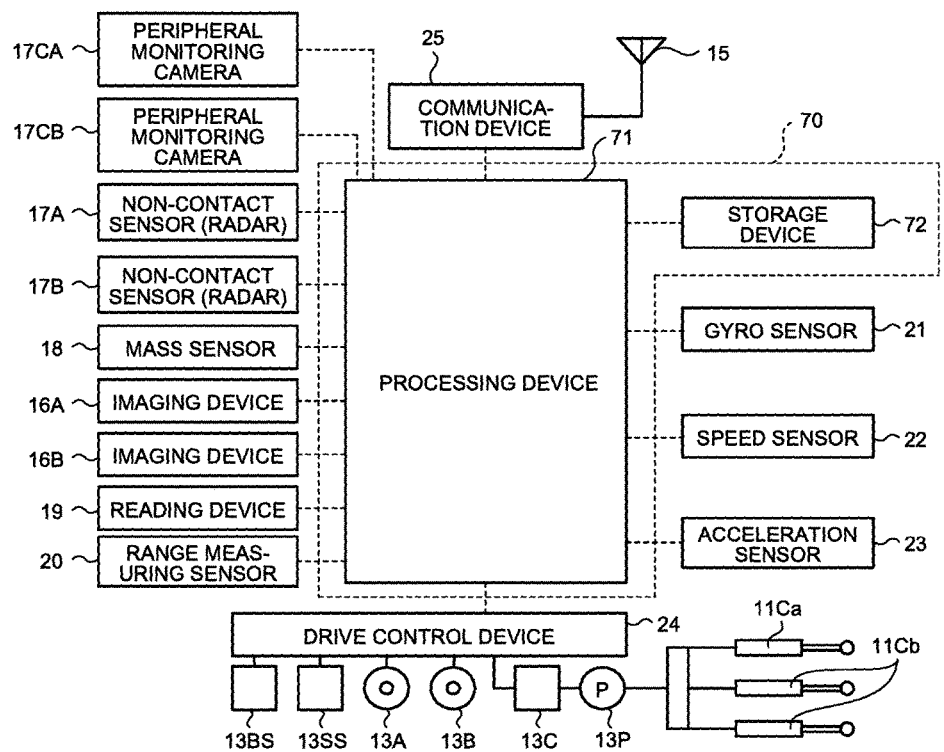
FIG. 12 is an example of a block diagram illustrating a control device included in the carrying machine.

FIG. 12 is an example of a block diagram illustrating a control device 70 included in the carrying machine 10. The control device 70 included in the carrying machine 10 controls traveling of the carrying machine 10, and movement and lifting and lowering of the vessel 11 in the width direction. The control device 70 includes a processing device 71 and a storage device 72. The imaging devices 16A and 16B, the non-contact sensors 17A and 17B, the peripheral monitoring cameras 17CA and 17CB, a mass sensor 18, a reading device 19, a range measuring sensor 20, a gyro sensor 21, a speed sensor 22, an acceleration sensor 23, a drive control device 24, a communication device 25, and the storage device 72 are connected to the processing device 71.

The imaging devices 16A and 16B and the peripheral monitoring cameras 17CA and 17CB include an imaging device such as a CCD or a CMOS, and can acquire an optical image of an object and detect an external form of the object. In the present embodiment, at least one of the imaging devices 16A and 16B and the peripheral monitoring cameras 17CA and 17CB include a stereo camera, and can acquire three-dimensional external form data of the object. The imaging devices 16A and 16B and the peripheral monitoring cameras 17CA and 17CB output a result of the imaging to the processing device 71. The processing device 71 acquires detection results of the imaging devices 16A and 16B, and acquires information related to the state of the ore MR in the vessel 11 based on the detection results. In the present embodiment, the external form of the ore MR loaded on the vessel 11 may be detected using at least one of a laser scanner and a three-dimensional distance sensor.

The non-contact sensors 17A and 17B are connected with the processing device 71, and outputs detection results to the processing device 71. The non-contact sensors 17A and 17B output acquired results to the processing device 71. The mass sensor 18 detects the mass of the vessel 11 and the ore MR loaded on the vessel 11. Since the mass of the vessel 11 is known in advance, if the mass of the vessel 11 is subtracted from the detection result of the mass sensor 18, the mass of the ore MR loaded on the vessel 11 can be obtained. The mass sensor 18 is connected with the processing device 71, and outputs a detection result to the processing device 71. The processing device 71 obtains the mass of the ore MR loaded on the vessel 11 and information as to whether the ore MR is loaded on the vessel 11, based on the detection result of the mass sensor 18. The mass sensor 18 may be a strain gauge load cell provided between the vessel 11 and the table 11T, or may be a pressure sensor that detects hydraulic pressure of the hydraulic cylinder 11Cb.

The reading device 19 detects identification information (unique information) of a mark provided in the drift DR. A plurality of the marks is arranged along the drift DR. The marks may be identifiers (codes) such as bar codes or two-dimensional codes, or identifiers (tags) such as IC tags or RFIDs. The reading device 19 is connected with the processing device 71, and outputs a detection result to the processing device 71.

The range measuring sensor 20 is attached to an outside of the vehicle body 10B of the carrying machine 10, for example, to front and rear portions, and acquires and outputs physical shape data of a space in a periphery of the carrying machine 10. The gyro sensor 21 detects an azimuth (azimuth change amount) of the carrying machine 10, and outputs a detection result to the processing device 71. The speed sensor 22 detects a travel speed of the carrying machine 10, and outputs a detection result to the processing device 71. The acceleration sensor 23 detects acceleration of the carrying machine 10, and outputs a detection result to the processing device 71. The drive control device 24 is, for example, a microcomputer. The drive control device 24 controls operations of the traveling motors 13A and 13B, a brake system 13BS, and a motor 13C that drives a steering system 13SS and a hydraulic pump 13P, based on a command from the processing device 71. The hydraulic pump 13P is a device that supplies a hydraulic oil to the hydraulic cylinders 11Ca and 11Cb. In the present embodiment, the carrying machine 10 travels by the traveling motors 13A and 13B. However, an embodiment is not limited thereto. For example, the carrying machine 10 may travel by a hydraulic motor that is driven by a hydraulic oil ejected from the hydraulic pump 13P. The brake system 13BS and the steering system 13SS may be electrically driven or may be operated using a hydraulic pressure.

In the present embodiment, the information regarding positions (absolute positions) where the marks are arranged in the drift DR is known information measured in advance. The information regarding absolute positions of the marks is stored in the storage device 72. The processing device 71 can obtain an absolute position of the carrying machine 10 in the drift DR based on a detection result of the marks (identification information of the marks), which has been detected by the reading device 19 provided in the carrying machine 10, and the stored information of the storage device 72.

The range measuring sensor 20 includes a scanning optical distance meter that can output the physical shape data of a space. The range measuring sensor 20 includes, for example, at least one of a laser scanner and a three-dimensional distance sensor, and can acquire and output two-dimensional or three-dimensional space data. The range measuring sensor 20 detects at least one of the loading machine 30 and a wall surface of the drift DR. In the present embodiment, the range measuring sensor 20 can acquire at least one of shape data of the loading machine 30, shape data of the wall surface of the drift DR, and shape data of the load on the vessel 11. Further, the range measuring sensor 20 can detect at least one of a relative position between the range measuring sensor 20 and the loading machine 30 (relative distance and azimuth) and a relative position between the range measuring sensor 20 and the wall surface of the drift DR. The range measuring sensor 20 outputs detected information to the processing device 71.

In the present embodiment, the information regarding a wall surface of the drift DR is obtained in advance and is stored in the storage device 72. That is, the information regarding the wall surface of the drift DR is known information measured in advance. The information regarding the wall surface of the drift DR includes information regarding respective shapes of the wall surface in a plurality of portions, and information regarding respective absolute positions of the portions of the wall surface. In the storage device 72, relationship between the shapes of the plurality of portions of the wall surface and the respective absolute positions in the portions of the wall surface having the shapes is stored. The processing device 71 can obtain the absolute position and azimuth of the carrying machine 10 in the drift DR based on the detection result of the wall surface (the shape data of the wall surface) of the drift DR, which has been detected by the range measuring sensor 20 provided in the carrying machine 10, and the stored information of the storage device 72.

The processing device 71 controls the carrying machine 10 that travels in the drift DR such that the carrying machine 10 travels according to a determined route (target route) in the underground MI, based on a current position (absolute position) of the carrying machine 10 derived using at least one of the reading device 19 and the range measuring sensor 20.

The processing device 71 is a microcomputer including a CPU, for example. The processing device 71 controls the traveling motors 13A and 13B, the brake system 13BS, and the steering system 13SS of the wheels 12A and 12B through the drive control device 24 based on the detection results of the non-contact sensors 17A and 17B, the reading device 19, and the range measuring sensor 20. The processing device 71 then causes the carrying machine 10 to travel according to the above-described target route at predetermined travel speed and acceleration.

The storage device 72 includes at least one of a RAM, a ROM, a flash memory, and a hard disk drive, and is connected with the processing device 71. The storage device 72 stores computer programs and various types of information necessary for the processing device 71 to cause the carrying machine 10 to autonomously travel. The communication device 25 is connected with the processing device 71, and performs data communication with at least one of the communication device mounted in the loading machine 30 and the management device 3.

In the present embodiment, the carrying machine 10 is an unmanned vehicle, and can autonomously travel. The communication device 25 can receive information (including a command signal) transmitted from at least one of the management device 3 and the loading machine 30. Further, the communication device 25 can transmit the information detected by the imaging devices 16A and 16B, the peripheral monitoring cameras 17CA and 17CB, the speed sensor 22, and the acceleration sensor 23 to at least one of the management device 3 and the loading machine 30. The carrying machine 10 transmits information of a periphery of the carrying machine 10 acquired by at least one of the peripheral monitoring cameras 17CA and 17CB and the non-contact sensors 17A and 17B to the management device 3, and an operator can remotely operate the carrying machine 10 based on the information of the periphery. As described above, the carrying machine 10 travels not only in an autonomous manner but also by the operation of the operator, and can cause the vessel 11 to slide, and lift and lower.

For example, the management device 3 that has acquired the information detected by the speed sensor 22, the acceleration sensor 23, and the like accumulates the information in the storage device 3M as operation information of the carrying machine 10, for example. Further, when the management device 3 acquires the information imaged by the peripheral monitoring cameras 17CA and 17CB, the operator can operate the carrying machine 10 while visually confirming images of the periphery of the carrying machine 10, which have been imaged by the peripheral monitoring cameras 17CA and 17CB. Further, the loading machine 30 that has acquired the information regarding the mass of the ore MR of the vessel 11, which has been detected by the mass sensor 18, can control a loading amount of the ore MR to the vessel 11 based on the information. Next, the loading machine 30 will be described.

<Loading Machine>

Figure 13:
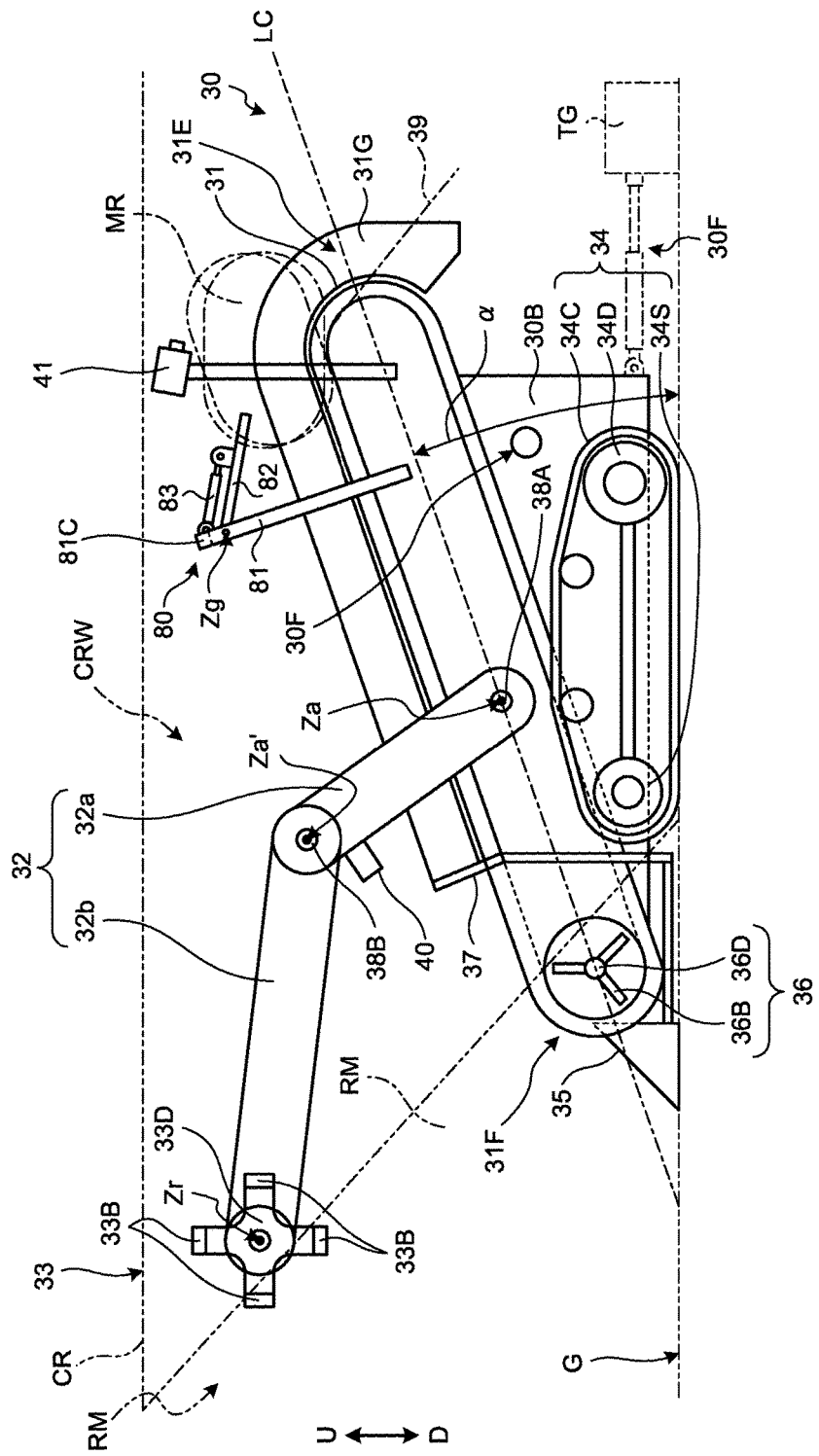
FIG. 13 is a side view of the loading machine according to the present embodiment.
Figure 14:
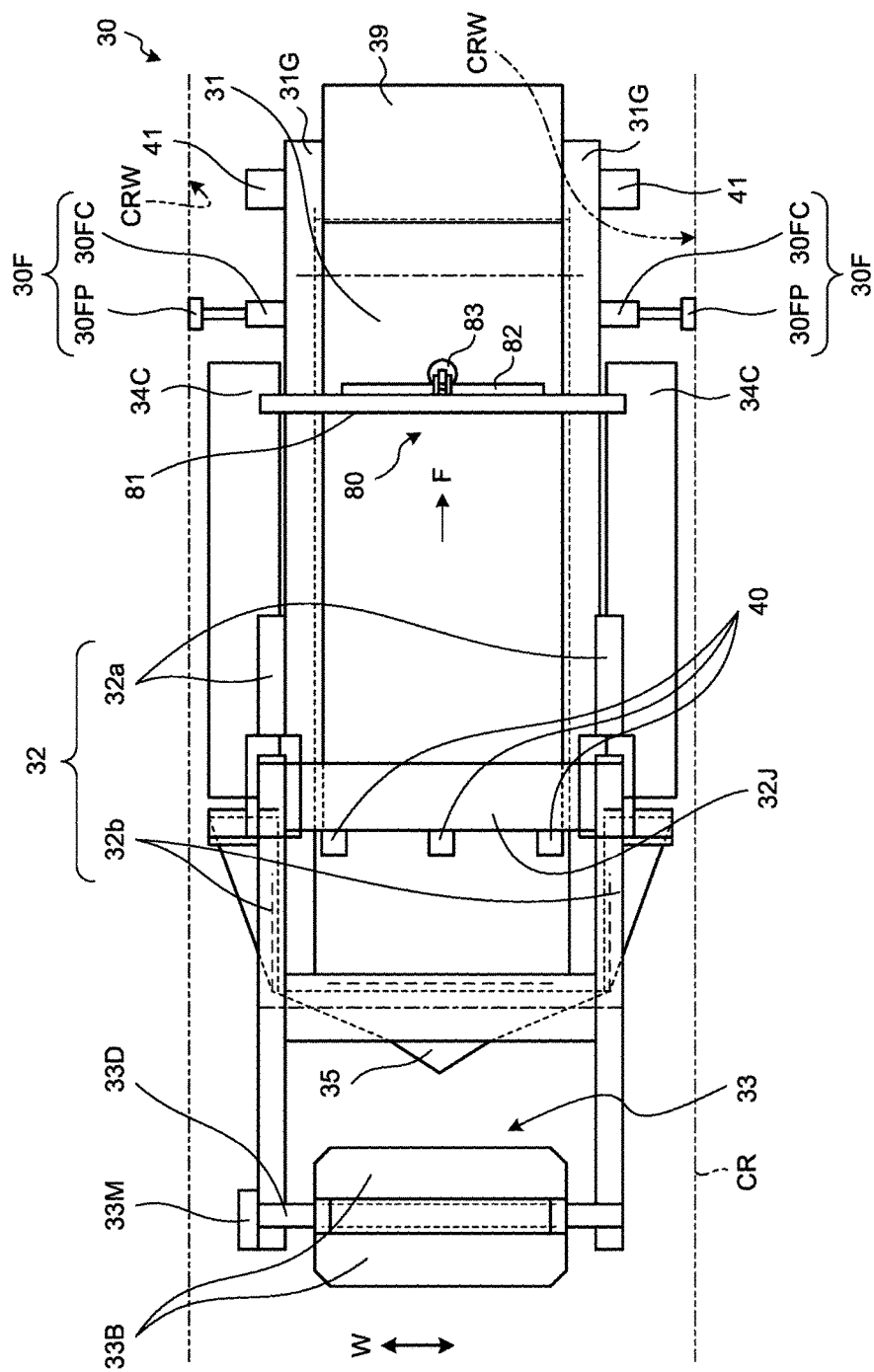
FIG. 14 is a top view of the loading machine according to the present embodiment.
Figure 15:
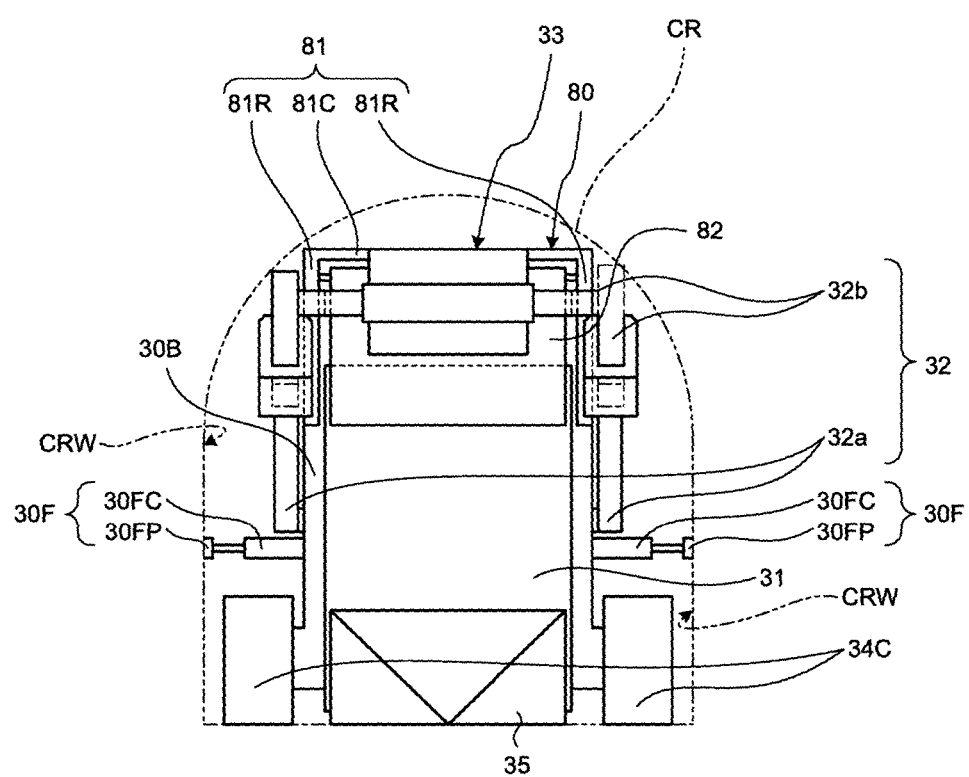
FIG. 15 is a front view of the loading machine according to the present embodiment.

FIG. 13 is a side view of the loading machine 30 according to the present embodiment. FIG. 14 is a top view of the loading machine 30 according to the present embodiment. FIG. 15 is a front view of the loading machine 30 according to the present embodiment. FIG. 13 illustrates a state in which the loading machine 30 excavates the ore MR of the rock mass RM and conveys the excavated ore MR. The loading machine 30 excavates the rock mass RM of the ore MR in the cross cut CR, and loads the excavated ore MR onto the vessel 11 of the carrying machine 10 illustrated in FIGS. 7 and 8, and the like. The feeder 31, the support mechanism 32, the traveling device 34, the intruding member 35, the rotation body 36, and the rock guard 37 are attached to the vehicle body 30B of the loading machine 30. A side to which the intruding member 35 is attached is the front of the loading machine 30, and a side at an opposite to the side to which the intruding member 35 is attached is the rear of the loading machine 30. Note that the loading machine 30 may not include the rotation body 36 and the rock guard 37.

The feeder 31 loads up the ore MR from the rock mass RM and conveys the ore MR in a direction of being away from the rock mass RM at the draw point DP, and then discharges the ore MR. That is, the feeder 31 conveys the ore MR loaded on the front portion of the loading machine 30 toward the rear portion, and discharges the ore MR from the rear portion. The feeder 31 uses a conveyance belt as an endless conveyance body, for example, and stretches the conveyance belt around a pair of rollers and rotates the conveyance belt, thereby to convey the ore MR from a loading side 31F to a discharge side 31E. The loading side 31F is a rock mass RM side, and the discharge side 31E is an opposite side to the loading side 31F. As illustrated in FIG. 14, the feeder 31 is provided with a pair of guides 31G and 31G at both sides in the width direction W. The pair of guides 31G and 31G suppresses drop of the ore MR from the feeder 31 during conveyance. The width direction W is a direction perpendicular to a direction F into which the feeder 31 conveys the ore MR, and is a direction parallel to a rotation center axis of the pair of rollers included in the feeder 31. The width direction W of the feeder 31 is also a width direction of the vehicle body 30B. The feeder 31 includes, at the discharge side 31E, a guide 39 that guides the ore MR into the vessel 11 of the carrying machine 10. The feeder 31 swings around the axial line of the front portion of the vehicle body 30B, that is, the loading side 31F of the feeder 31. The feeder 31 can change an angle α with respect to a ground G. The angle α is an angle made by a straight line LC that connects the rotation center axes of the pair of rollers included in the feeder 31 and the ground G.

It is the rotation roller 33 that loads the ore MR onto the feeder 31. The rotation roller 33 sends the ore MR to the feeder 31 while being rotated at the loading side 31F of the feeder 31, that is, in the front portion of the feeder 31. Therefore, at the time of excavation of the ore, the rotation roller 33 is installed at the loading side 31F of the feeder 31 by the support mechanism 32 including the boom 32a and the arm 32b. The rotation roller 33 includes a rotation member 33D rotated around a predetermined axial line Zr, and contact members 33B provided in an outer peripheral portion of the rotation member 33D, and coming in contact with the ore MR and excavating the ore MR. In the present embodiment, the contact members 33B are a plurality of plate-like members protruding from the rotation member 33D outward in a radial direction and provided along a circumferential direction of the rotation member 33D at predetermined intervals. Plane parallel to plate surfaces of the contact members 33B are not perpendicular to the axial line Zr. In the present embodiment, the planes parallel to the plate surfaces of the contact members 33B are parallel to the axial line Zr. The contact members 33B may be bent such that tip end portions, that is, end portions at an opposite side to the rotation member 33D side eat into the rock mass RM that is an object to be excavated.

When the rotation roller 33 is rotated, the contact members 33B are away from the feeder 31 when positioned at an upward side U, and approach the feeder 31 when positioned at a downward side D. With this movement, the plurality of contact members 33B excavates the ore MR from the rock mass RM and sends the ore MR to the feeder 31. The plurality of contact members 33B is rotated together with the rotation member 33D, and thus can sequentially excavate the ore MR and send the ore MR to the feeder 31.

The support mechanism 32 that rotatably supports the rotation roller 33 includes the boom 32a attached to the vehicle body 30B and the arm 32b connected to the boom 32a. The boom 32a is attached to the vehicle body 30B of the loading machine 30 through a shaft 38A, and swings around the shaft 38A with respect to the vehicle body 30B, for example. The arm 32b is connected with an end portion of the boom 32a at an opposite side to the vehicle body 30B through a shaft 38B, and swings around the shaft 38B with respect to the boom 32a, for example. The arm 32b rotatably support the rotation roller 33 with an end portion at an opposite side to an end portion connected with the boom 32a. The boom 32a and the arm 32b may be driven by a hydraulic cylinder as an actuator and swing, or may be driven by a motor or a hydraulic motor and swing, for example.

The boom 32a swings around a first axial line Za with respect to the vehicle body 30B, and the arm 32b swings around an axial line Za' parallel to the first axial line Za. The first axial line Za is a central axis of the shaft 38A that connects the boom 32a and the vehicle body 30B, and the axial line Za' parallel to the first axial line Za is a central axis of the shaft 38B that connects the boom 32a and the arm 32b. In the present embodiment, the arm 32b may further swing around an axial line parallel to a second axial line perpendicular to the first axial line Za. In doing so, a range where the rotation roller 33 can be moved becomes large, and thus the degree of freedom of the excavation work is enhanced.

The boom 32a is a pair of rod-like members (first rod-like members) provided at both sides of the vehicle body 30B in the width direction W, that is, both sides of the feeder 31 in the width direction W in the present embodiment. The arm 32b is a pair of rod-like members (second rod-like members) connected to the respective booms 32a. As illustrated in FIG. 14, the pair of arms 32b supports the rotation roller 33 therebetween. In the present embodiment, the pair of booms 32a is connected by a beam 32J. With such a structure, rigidity of the support mechanism 32 is enhanced, and thus the support mechanism 32 can reliably press the rotation roller 33 against the rock mass RM at the time of excavation of the ore MR. Therefore, a decrease in excavation efficiency of the ore MR can be suppressed. Further, the pair of arms 32b may be connected by a rod-like or plate-like member. In doing so, the rigidity of the support mechanism 32 can be further enhanced, and thus it is favorable.

In the support mechanism 32, the boom 32a swings with respect to the vehicle body 30B, and the arm 32b swings with respect to the boom 32a, so that the rotation roller 33 is moved. The support mechanism 32 can change relative positional relationship between the rotation roller 33, and the feeder 31 and the vehicle body 30B by moving the rotation roller 33. Further, the support mechanism 32 can scoop the ore MR from the rock mass RM to the feeder 31 side by excavating different positions of the rock mass RM and moving the rotation roller 33 from the rock mass RM toward the feeder 31 by moving the rotation roller 33. Further, for example, in a case where an object exists in front and obstructs the traveling during traveling of the loading machine 30, the support mechanism 32 can remove the object in front of the proceeding direction of the loading machine 30 by scooping the object using the rotation roller 33 toward the feeder 31 and sending the object to the feeder 31.

In the present embodiment, as illustrated in FIG. 14, the rotation roller 33 is rotated by a motor 33M attached to a tip end portion of the arm 32b. The device that drives the rotation roller 33 is not limited to the motor 33M, and may be, for example, a hydraulic motor. Further, the place where the motor 33M is attached is not limited to the tip end portion of the arm 32b.

The traveling device 34 that causes the vehicle body 30B to travel is attached to the vehicle body 30B. The traveling device 34 includes a pair of crawlers 34C provided at both sides of the vehicle body 30B in the width direction, a pair of driving wheels 34D provided at both sides of the vehicle body 30B in the width direction, and a pair of driven wheels 34S provided at both sides of the vehicle body 30B in the width direction. The crawlers 34C are stretched around the driving wheels 34D and the driven wheels 34S. The driving wheels 34D are independently and separately driven. In the present embodiment, the loading machine 30 includes travel motors in the respective driving wheels 34D. With such a structure, the pair of crawlers 34C and 34C is independently and separately driven.

The intruding member 35 is attached to the vehicle body 30B. The intruding member 35 is arranged at the loading side 31F of the feeder 31 of the vehicle body 30B. The intruding member 35 is a member having a pyramid shape. In the present embodiment, the intruding member 35 has a quadrangular pyramid shape. The shape of the intruding member 35 is not limited to the quadrangular pyramid shape, and may be, for example, a trigonal pyramid shape. The intruding member 35 is attached to the vehicle body 30B such that an apex of the pyramid serves as a front portion of the vehicle body 30B. In doing so, when the loading machine 30 intrudes into the rock mass RM, the intruding member 35 intrudes into the rock mass RM with the apex.

The intruding member 35 intrudes into the rock mass RM with the apex of the pyramid and crushes the rock mass RM at the time of excavation by the loading machine 30. When the intruding member 35 intrudes into the rock mass RM, the traveling device 34 causes the intruding member 35 to intrude into the rock mass RM while causing the vehicle body 30B to which the feeder 31 and the intruding member 35 are attached to travel to the front, and operating the feeder 31. At this time, an upper conveyance belt of the feeder 31 is moved from the loading side 31F to the discharge side 31E. The loading machine 30 operates the feeder 31 in this way at the time of intrusion, thereby to use driving force of the feeder 31 for the intrusion. Therefore, loading machine 30 can intrude into the rock mass RM deeper.

A pair of the rotation bodies 36 is provided at both sides of the vehicle body 30B in the width direction, that is, both sides in a direction perpendicular to a conveying direction of the feeder 31. The pair of rotation bodies 36 is arranged in front portions of the traveling device 34 and at the loading side 31F of the feeder 31. The rotation body 36 has a structural body in which a plurality of blades 36B is provided around a drum 36D rotated around a predetermined axial line at predetermined intervals. The rotation bodies 36 are driven by a motor, for example. The rotation bodies 36 may be driven by the motor that drives the feeder 31. In this case, drive of the feeder 31 and drive of the rotation bodies 36 may be switched with a clutch or the like. For example, when the clutch is engaged, the feeder 31 and the rotation bodies 36 can be rotated at the same time, and when the clutch is canceled, only the feeder 31 can be rotated.

The rotation bodies 36 are rotated in a direction of pressing the vehicle body 30B of the loading machine 30 against the ground G when the intruding member 35 intrudes into the rock mass RM. To be specific, the rotation bodies 36 are rotated such that the blades 36B at the rock mass RM side are moved from the downward side D toward the upward side U, and the blades 36B at the traveling device 34 side are moved from the upward side U to the downward side D. In doing so, the rotation bodies 36 press the front portion of the vehicle body 30B to the downward side D when the blades 36B at the rock mass RM side come in contact with the rock mass RM. Therefore, the crawlers 34C of the traveling device 34 are more strongly pressed against the ground G. As a result, friction force between the crawlers 34C and the ground G is increased. Therefore, the traveling device 34 can easily cause the intruding member 35 to intrude into the rock mass RM. When the intrusion of the loading machine 30 into the rock mass RM is completed, and the excavation by the rotation roller 33 and the loading by the feeder 31 are started, the rotation of the rotation bodies 36 is stopped.

The rock guard 37 is provided between the rotation bodies 36 and the crawlers 34C of the traveling device 34. In the present embodiment, the rock guard 37 is attached to the vehicle body 30B. The rock guard 37 protects the traveling device 34 from the ore MR flying from the rotation roller 33 during excavation, and protects the traveling device 34 from rocks and the like existing in the roadway at the time of traveling of the loading machine 30, for example. With the rock guard 37, a decrease in durability of the traveling device 34 is suppressed.

In the present embodiment, the vehicle body 30B includes a fixing device 30F extending outward in the width direction of the vehicle body 30B, and pressed against a wall surface CRW of the cross cut CR continuing to the draw point DP. In the present embodiment, the fixing devices 30F are provided to face each other at both sides of the vehicle body 30B in the width direction. However, the number and the installation place of the fixing devices 30F are not limited thereto. For example, the fixing device 30F may be provided on an upper portion of the vehicle body 30B. In the present embodiment, the fixing device 30F includes, for example, a hydraulic cylinder 30FC and a pressing member 30FP provided in a top end of a piston of the hydraulic cylinder 30FC. At the time of excavation and conveyance of the ore MR of the loading machine 30, the fixing devices 30F fix the loading machine 30 in the cross cut CR. To be specific, the fixing devices 30F stretch the hydraulic cylinders 30FC and press the pressing members 30FP against the wall surfaces CRW, thereby to fix the vehicle body 30B of the loading machine 30 to the cross cut CR through these members. In doing so, reaction force generated when the loading machine 30 excavates the rock mass RM can be received by the cross cut CR through the fixing devices 30F. As a result, the posture of the loading machine 30 is stabilized, and thus can stably excavate the rock mass RM. After the hydraulic cylinders are provided between the fixing devices 30F and the vehicle body 30B and the fixing devices 30F are fixed to the wall surfaces CRW of the cross cut CR, the vehicle body may intrude using driving force of the hydraulic cylinders.

In a case where the fixing devices 30F are provided at both sides of the vehicle body 30B in the width direction or on the upper portion, fixation by the fixing devices 30F is canceled at the time of intrusion of the loading machine 30. In the present embodiment, the hydraulic cylinders 30FC become a contracted state, and the pressing members 30FP do not press the wall surfaces CRW. At the time of excavation of the loading machine 30, the fixing devices 30F are operated and fix the loading machine 30 in the cross cut CR. During the excavation, in a case where the loading machine 30 further intrudes into the rock mass RM or is away from the rock mass RM, after the fixation by the fixing devices 30F is canceled, the traveling device 34 moves the loading machine 30.

As illustrated in FIG. 13, the above-described reaction force may be received by providing the fixing device 30F to a rear portion of the vehicle body 30B, that is, at the discharge side 31E of the feeder 31, and causing the fixing device 30F to lie between a reaction receiver TG protruding from the ground G in the cross cut CR and the vehicle body 30B. At the time of excavation, the reaction force of the loading machine 30 in the front and rear direction is large. With this structure, the reaction force at the time of excavation can be more effectively received. Further, the loading machine 30 can adjust the position of the loading machine 30 at the time of excavation by stretching the fixing devices 30F. Note that the loading machine 30 may not include the fixing devices 30F.

In the present embodiment, the loading machine 30 includes a switching mechanism 80 that switches discharge of the ore MR and stop of the discharge between a portion (loading side 31F) where the ore MR is loaded onto the feeder 31 and a portion (discharge side 31E) where the ore MR is discharged from the feeder 31. The switching mechanism 80 includes a support body 81, a cover 82, and a hydraulic cylinder 83 as an actuator that opens/closes the cover 82. As illustrated in FIG. 15, the support body 81 is a gate-like member including two leg portions 81R having one end potions attached to both sides of the vehicle body 30B in the width direction, to be specific, both sides of the feeder 31 in the width direction, and a connection portion 81C that connects the two leg portions 81R at the other end portions. The ore MR passes through a portion surrounded by the two leg portions 81R and the connection portion 81C.

The cover 82 is a plate-like member and is provided in the portion surrounded by the two leg portions 81R and the connection portion 81C. The cover 82 rotationally moves around a predetermined axial line Zg existing at the connection portion 81C side of the support body 81. The hydraulic cylinder 83 is provided between the cover 82 and the connection portion 81C of the support body 81. When the hydraulic cylinder 83 extends/contracts, the cover 82 opens/closes the portion surrounded by the two leg portions 81R and the connection portion 81C. When the cover 82 opens the portion, the ore MR passes through the portion surrounded by the two leg portions 81R and the connection portion 81C. When the cover 82 closes the portion, the ore MR does not pass through the portion surrounded by the two leg portions 81R and the connection portion 81C. In doing so, the loading machine 30 can adjust the discharge amount of the ore MR from the feeder 31.

In the present embodiment, the loading machine 30 includes an information collecting device 40. The information collecting device 40 is attached to the loading side 31F of the vehicle body 30B, that is, to the front portion. To be more specific, the information collecting device 40 is attached such that a portion that collects the information faces the loading side 31F of the vehicle body 30B, that is, the front portion. The information collecting device 40 is a device that acquires and outputs three-dimensional space data. The information collecting device 40 acquires ore information as information regarding the state of the ore MR of the rock mass RM. The ore information is three-dimensional space data of the rock mass RM.

The information collecting device 40 is, for example, a camera, a stereo camera, a laser scanner, or a three-dimensional distance sensor. The portion of the information collecting device 40 that collects the information is a lens in a case of the camera or the stereo camera and is a light-receiving portion in a case of the laser scanner or the three-dimensional distance sensor. In the present embodiment, as the information collecting device 40, the stereo camera is used. In the present embodiment, the loading machine 30 has three information collecting devices 40 attached to a beam 32J of the support mechanism 32. That is, the plurality of information collecting devices 40 is arranged in a plurality of places in the width direction of the vehicle body 30B. In doing so, the loading machine 30 can obtain the ore information of an object to be imaged with other information collecting devices 40 even if the object to be imaged of one information collecting device 40 is hidden by the arm 32b.

In the present embodiment, the control device included in the loading machine 30 controls the operation of the loading machine 30 using the ore information collected by the information collecting devices 40. For example, the above-described control device controls at least one of the feeder 31, the rotation roller 33, the support mechanism 32, and the traveling device 34 based on the ore information acquired by the information collecting devices 40. In doing so, the loading machine 30 can be flexibly operated according to the state of the rock mass RM and the ore MR. Therefore, for example, production efficiency of the mine M is enhanced.

In the present embodiment, the loading machine 30 includes information collecting devices 41 at the discharge side 31E of the vehicle body 30B, that is, to rear portions. To be more specific, the information collecting device 41 is attached such that a portion that collects information faces the discharge side 31E of the vehicle body 30B, that is, the rear portion. Similarly to the above-described information collecting device 40, the information collecting device 41 is a device that acquires and outputs three-dimensional space data. The information collecting device 41 acquires load information as information regarding a state of the ore MR loaded on the vessel 11 of the carrying machine 10 illustrated in FIGS. 4 and 5. The load information is three-dimensional space data of the ore MR.

The information collecting device 41 is, for example, a camera, a stereo camera, a laser scanner, or a three-dimensional distance sensor, similarly to the above-described information collecting device 40. The portion of the information collecting device 41 that collects the information is a lens in a case of the camera or the stereo camera, and is a light-receiving portion in a case of the laser scanner or the three-dimensional distance sensor. In the present embodiment, as the information collecting device 41, the stereo camera is used. In the present embodiment, the loading machine 30 has two information collecting devices 41 attached to both sides of the feeder 31 in the width direction. That is, a plurality of the information collecting devices 41 is installed in a plurality of places in the width direction of the vehicle body 30B. In doing so, the loading machine 30 can obtain the ore information of an object to be imaged by other information collecting devices 41 even when the object to be imaged of one information collecting device 41 is hidden by shadow of the roadway.

In the present embodiment, the control device included in the loading machine 30 controls at least one of the loading machine 30 and the carrying machine 10 using the load information collected by the information collecting devices 41. For example, the above-described control device controls the operation of the rotation roller 33, the feeder 31, or the switching mechanism 80 based on the load information acquired by the information collecting devices 41, and controls the position and movement of the vessel 11 included in the carrying machine 10. In doing so, the loading machine 30 can change the conveyance amount of the ore MR and adjust the position of the vessel 11 according to the state of the ore MR loaded on the vessel 11 of the carrying machine 10. Therefore, the production efficiency of the mine M is enhanced, for example.

Figure 16:
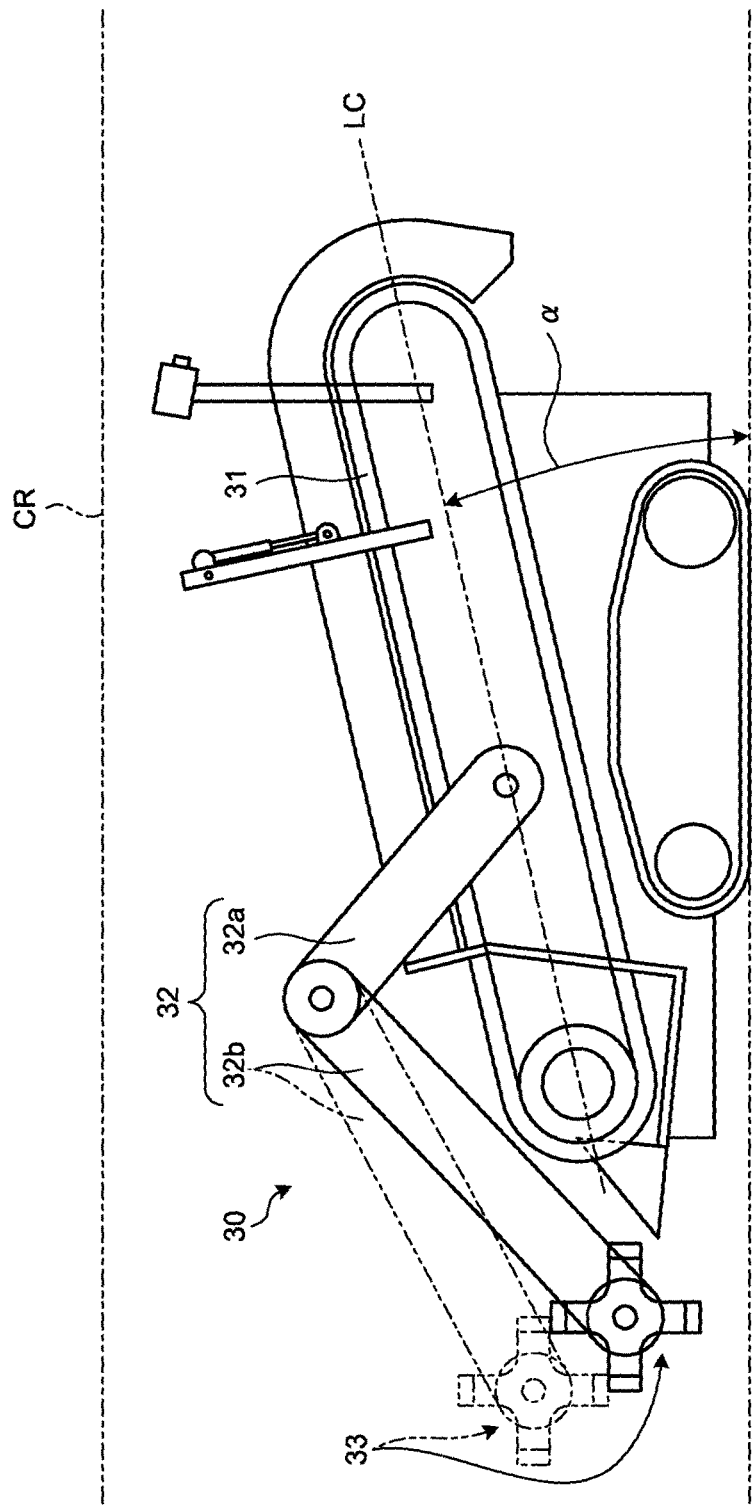
FIG. 16 is a diagram illustrating a posture of when the loading machine according to the present embodiment travels.

FIG. 16 is a diagram illustrating a posture of when the loading machine 30 according to the present embodiment travels. The angle α of the feeder 31 with respect to the ground G in a case where the loading machine 30 travels is smaller than that of a case where the loading machine 30 excavates and conveys the ore MR (see FIG. 13). That is, the straight line LC that connects the rotation center axes of the pair of rollers included in the feeder 31 becomes more parallel to the ground G. In doing so, the loading side 31F of the feeder 31 arranged in the front portion of the loading machine 30, that is, arranged at the proceeding direction side is separated from the ground, and thus a possibility that the feeder 31 and the ground G interfere with each other at the time of traveling of the loading machine 30 can be decreased.

As illustrated in FIG. 16, when the loading machine 30 travels, the support mechanism 32 is folded. Then, the rotation roller 33 is moved to a position closer to the feeder 31 than a case where the loading machine 30 excavates and conveys the ore MR (see FIG. 13). Therefore, balance of the mass in the front and rear portions of the loading machine 30 is enhanced, because the rotation roller 33 existing in a position separated from the center of gravity in the front and rear direction of the vehicle body 30B is moved to a position closer to the center of gravity. As a result, the loading machine 30 can stably travel.

Figure 17:
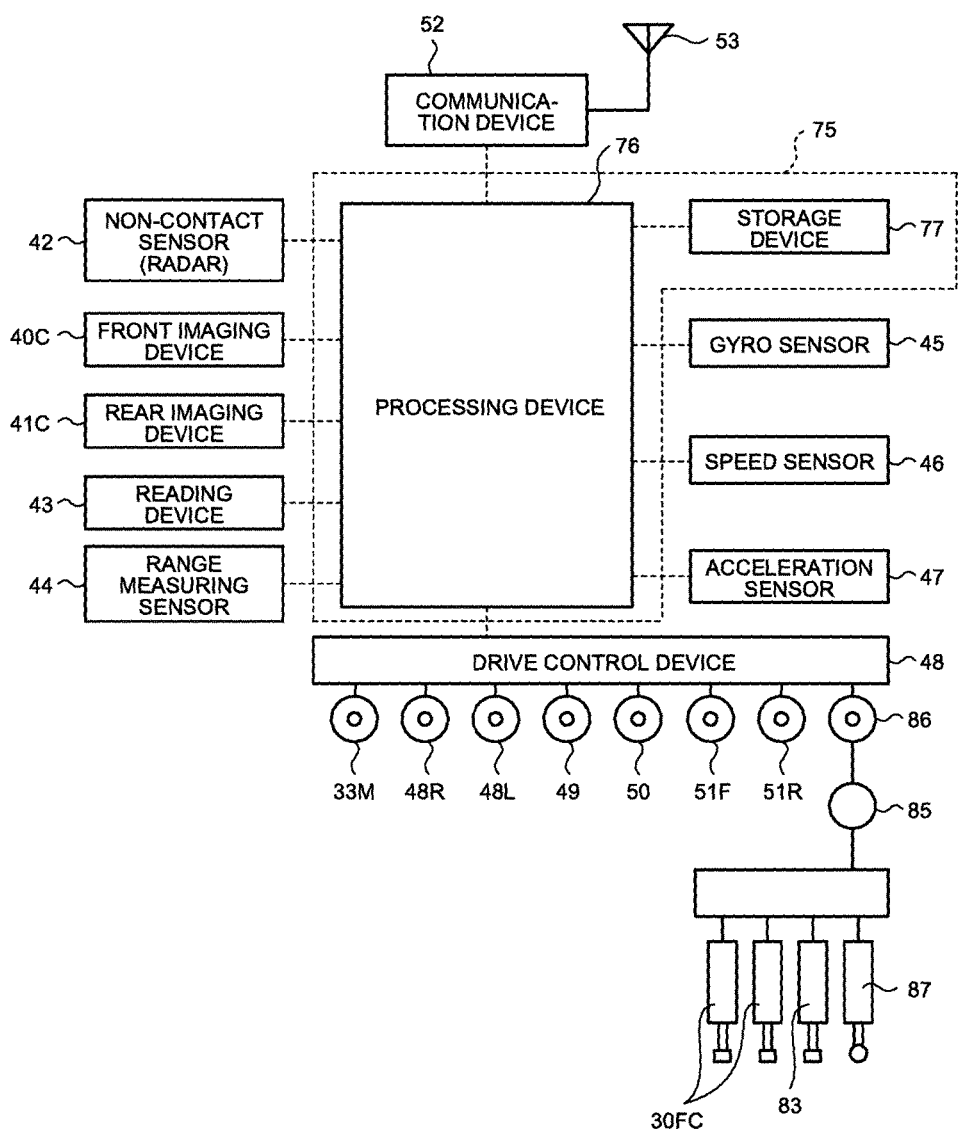
FIG. 17 is an example of a block diagram illustrating a control device included in the loading machine according to the present embodiment.

FIG. 17 is an example of a block diagram illustrating a control device 75 included in the loading machine 30 according to the present embodiment. The control device 75 included in the loading machine 30 controls the feeder 31, the support mechanism 32, the rotation roller 33, the traveling device 34, the rotation body 36, and the switching mechanism 80. The control device 70 includes a processing device 76 and a storage device 77. A front imaging device 40C corresponding to the information collecting device 40, a rear imaging device 41C corresponding to the information collecting device 41, a non-contact sensor 42, a reading device 43, a range measuring sensor 44, a gyro sensor 45, a speed sensor 46, an acceleration sensor 47, a drive control device 48, a communication device 52, and the storage device 77 are connected to the processing device 76. The non-contact sensor 42, the reading device 43, and the range measuring sensor 44 are attached to an outside of the vehicle body 30B of the loading machine 30.

The front imaging device 40C and the rear imaging device 41C include an imaging device such as a CCD or a CMOS, and can acquire an optical image of an object and detect an external form of the object. In the present embodiment, the front imaging device 40C and the rear imaging device 41C include a stereo camera, and can acquire three-dimensional external form data of the object. The front imaging device 40C and the rear imaging device 41C output imaged results to the processing device 76. The processing device 76 acquires a detection result of the front imaging device 40C, and obtains the above-described ore information based on the detection result. Further, the processing device 76 acquires a detection result of the rear imaging device 41C, and obtains the above-described load information base on the detection result. In the present embodiment, an external form of the ore MR of the rock mass RM and an external form of the ore MR loaded on the vessel 11 may be detected using at least one of a laser scanner and a three-dimensional distance sensor.

The non-contact sensor 42 detects an object existing in a periphery of the loading machine 30. The non-contact sensor 42 is connected with the processing device 76, and outputs a detection result to the processing device 76. The non-contact sensor 42 outputs an acquired result to the processing device 76. The reading device 43 detects identification information (unique information) of a mark provided in the drift DR or the cross cut CR. A plurality of the marks is arranged along the drift DR or the cross cut CR. The reading device 43 is connected with the processing device 76, and outputs a detection result to the processing device 76. The marks may be identifiers (codes) such as bar codes or two-dimensional codes, or identifiers (tags) such as IC tags or RFIDs.

In the present embodiment, information regarding positions (absolute positions) where the marks are arranged in the drift DR and the cross cut CR is known information measured in advance. The information regarding absolute positions of the marks is stored in the storage device 77. The processing device 76 can obtain an absolute position of the loading machine 30 in the drift DR or the cross cut CR base on a detection result of the marks (the identification information of the marks) detected by the reading device 43 provided in the loading machine 30 and the stored information of the storage device 77.

The range measuring sensor 44 acquires and outputs physical shape data of a space. The gyro sensor 45 detects an azimuth (azimuth change amount) of the loading machine 30, and outputs a detection result to the processing device 76. The speed sensor 46 detects a travel speed of the loading machine 30, and outputs a detection result to the processing device 76. The acceleration sensor 47 detects acceleration of the loading machine 30, and outputs a detection result to the processing device 76. The drive control device 48 is a microcomputer, for example. The drive control device 48 controls operations of the motor 33M that drives the rotation roller 33, motors 48L and 48R included in the traveling device 34, a motor 49 that causes the boom 32a of the support mechanism 32 to swing, a motor 50 that causes the arm 32b to swing, a motor 51F that drives the feeder 31, a motor 51R that rotates the rotation body 36, and a motor 86 that drives a hydraulic pump 85, which are illustrated in FIG. 13, based on a command from the processing device 76. The hydraulic pump 85 is a device that supplies a hydraulic oil to the hydraulic cylinder 83 included in the switching mechanism 80, a hydraulic cylinder 87 as an actuator that changes the posture of the feeder 31, and the hydraulic cylinder 30FC of the fixing device 30F. The boom 32a and the arm 32b may swing by hydraulic cylinders. In this case, the hydraulic oil is supplied from the hydraulic pump 85 to a boom cylinder that causes the boom 32a to swing and an arm cylinder that causes the arm 32b to swing. The motor 48L drives one crawler 34C illustrated in FIG. 14, and the motor 48R drives the other crawler 34C. The motor 48L drives one crawler 34C illustrated in FIG. 14, and the motor 48R drives the other crawler 34C.

In the present embodiment, the loading machine 30 travels by the motors 48L and 48R included in the traveling device 34. However, an embodiment is not limited thereto. For example, the loading machine 30 may travel by a hydraulic motor driven by a hydraulic oil ejected from the hydraulic pump 85. Further, the boom 32a and arm 32b of the support mechanism 32, the rotation rotor 33, the rotation body 36, and the feeder 31 may also be driven by a hydraulic cylinder or a hydraulic motor driven by the hydraulic oil ejected from the hydraulic pump 85.

The range measuring sensor 44 includes a scanning optical distance meter that can output the physical shape data of a space. The range measuring sensor 44 includes at least one of a laser range finder, a laser scanner, and a three-dimensional scanner, and can acquire and output three-dimensional space data. The range measuring sensor 44 detects at least one of the carrying machine 10, and the wall surfaces of the drift DR and the cross cut CR. In the present embodiment, the range measuring sensor 44 can acquire at least one of shape data of the carrying machine 10, shape data of the wall surface of the drift DR or the cross cut CR, and shape data of the load on the vessel 11 included in the carrying machine 10. Further, the range measuring sensor 44 can detect at least one of a relative position between the range measuring sensor 44 and the carrying machine 10 (relative distance and azimuth) and a relative position between the range measuring sensor 44 and the wall surface of the drift DR or the cross cut CR. The range measuring sensor 44 outputs detected information to the processing device 76.

In the present embodiment, information regarding the wall surfaces of the drift DR and the cross cut CR is obtained in advance and is stored in the storage device 77. That is, the information regarding the wall surface of the drift DR is known information measured in advance. The information regarding the wall surface of the drift DR includes information regarding respective shapes of the wall surface in a plurality of portions, and information regarding respective absolute positions of the portions of the wall surface. In the storage device 77, relationship between the shapes of the plurality of portions of the wall surface and the respective absolute positions in the portions of the wall surface having the shapes is stored. The processing device 76 can obtain the absolute position and azimuth of the loading machine 30 in the drift DR based on the detection result of the wall surface (the shape data of the wall surface) of the drift DR, which has been detected by the range measuring sensor 20 provided in the loading machine 30, and the stored information of the storage device 77.

The processing device 76 controls the loading machine 30 that travels in the drift DR or the cross cut CR such that the loading machine 30 travels according to a determined route (target route) in the underground MI based on a current position (absolute position) of the loading machine 30 derived using at least one of the reading device 43 and the range measuring sensor 44. At this time, the processing device 76 controls the loading machine 30 such that the loading machine 30 is arranged at the designated draw point DP.

The processing device 76 is a microcomputer including a CPU, for example. The processing device 76 controls the motors 48L and 48R included in the traveling device 34 through the drive control device 48 based on the detection results of the front imaging device 40C, the rear imaging device 41C, the non-contact sensor 42, and the reading device 43. The processing device 76 then causes the loading machine 30 to travel according to the above-described target route at predetermined travel speed and acceleration.

The storage device 77 includes at least one of a RAM, a ROM, a flash memory, and a hard disk drive, and is connected with the processing device 76. The storage device 77 stores computer programs and various types of information necessary for the processing device 76 to cause the loading machine 30 to autonomously travel. The communication device 52 is connected with the processing device 76, and performs data communication with at least one of the communication device mounted on the carrying machine 10 and the management device 3.

In the present embodiment, the loading machine 30 is an unmanned vehicle and can autonomously travel. The communication device 52 can receive information (including a command signal) transmitted from at least one of the management device 3 and the carrying machine 10 through an antenna 53. Further, the communication device 52 can transmit the information detected by the front imaging device 40C, the rear imaging device 41C, the non-contact sensor 42, the reading device 43, the range measuring sensor 44, the gyro sensor 45, the speed sensor 46, the acceleration sensor 47, and the like to at least one of the management device 3 and the carrying machine 10 through the antenna 53. The loading machine 30 is not limited to an unmanned vehicle that can autonomously travel. For example, the management device 3 may acquire an image imaged by the front imaging device 40C and display the image on the display device 8 illustrated in FIG. 6, and the operator may control the excavation, loading, and traveling of the loading machine 30 while visually confirming the displayed image by a remote operation. Further, the management device 3 may acquire an image imaged by the rear imaging device 41C and display the image on the display device 8 illustrated in FIG. 6, and the operator may control the excavation and loading of the loading machine 30 and the operation of the vessel 11 of the carrying machine 10 while visually confirming the displayed image by a remote operation.

For example, the management device 3 that has acquired the information detected by the speed sensor 46, the acceleration sensor 47, and the like accumulates the information in the storage device 3M as operation information of the loading machine 30, for example. Further, when the management device 3 acquires the information imaged by the front imaging device 40C or the rear imaging device 41C, the operator can operate the loading machine 30 while visually confirming an image in a periphery of the loading machine 30, which has been imaged by the front imaging device 40C or the rear imaging device 41C. Further, the carrying machine 10 that has acquired the information regarding the state of the ore MR of the vessel 11, which has been detected by the rear imaging device 41C can control the loading amount of the ore MR to the vessel 11 or the position of the vessel 11 based on the information. In the present embodiment, the loading machine 30 is electrically driven. However, an internal-combustion engine may be employed as a power source.

Figure 18:
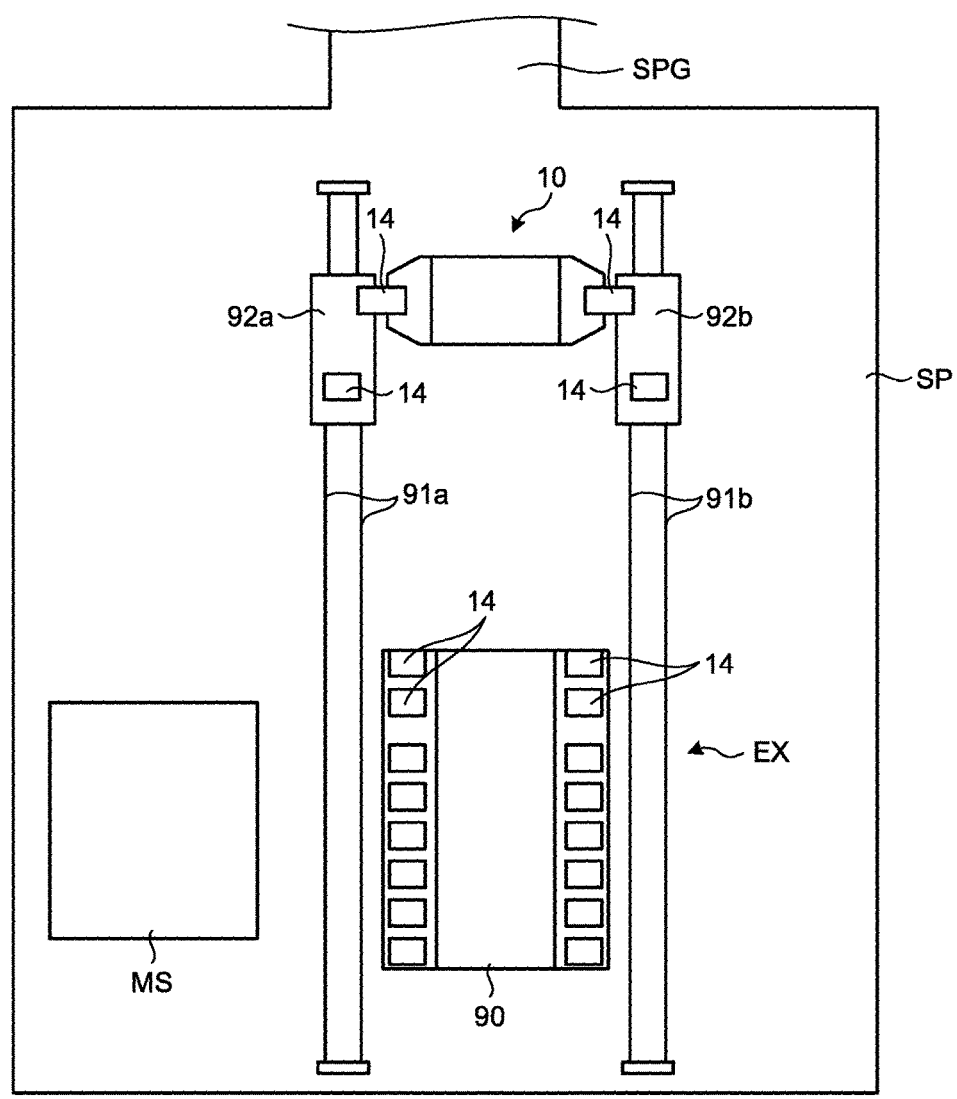
FIG. 18 is a diagram illustrating an example of a storage battery handling device included in the mine mining system according to the present embodiment.

FIG. 18 is a diagram illustrating an example of storage battery replacing device EX included in the mine management system 1 according to the present embodiment. The storage battery replacing device EX is installed in the space SP. In the present embodiment, in the space SP, a maintenance space MS in which the carrying machine 10 and the loading machine 30 are maintained is provided. The storage battery replacing device EX includes a storage battery holding device 90, a pair of guides 91a and 91b installed at both sides of the storage battery holding device 90, and replacement carriages 92a and 92b guided by the respective guides 91a and 91b. The storage battery holding device 90 holds a plurality of the replacement storage batteries 14. The storage battery holding device 90 has a function as a charger that charges a discharged storage battery 14. The guide 91a is provided at one side of the storage battery holding device 90, and the guide 91b is provided at the other side of the storage battery holding device 90. The guide 91a is two rails extending from the storage battery holding device 90 toward a doorway SPG of the space SP. The guide 91b is similar to the guide 91a. The carriage 92a is attached to the guide 91a and is moved along the guide 91a, and the carriage 92b is attached to the guide 91b and is moved along the guide 91b.

The carrying machine 10 that has proceeded in the space SP for replacing the storage battery 14 stops between the guide 91a and the guide 91b. At this time, the carrying machine 10 stops, causing one storage battery 14 to face the guide 91a and the other storage battery 14 to face the guide 91b. The carriages 92a and 92b receive charged storage batteries 14 from the storage battery holding device 90 and are moved toward the carrying machine 10. When the carriages 92a and 92b are moved to positions facing the carrying machine 10, the carriages 92a and 92b move discharged storage batteries 14 mounted on the carrying machine 10 from the carrying machine 10 to own upper portions. Next, the carriages 92a and 92b are moved to positions where the mounted charged storage batteries 14 face the carrying machine 10. Following that, the carriages 92a and 92b load the charged storage batteries 14 onto the carrying machine 10. The carriages 92a and 92b return to the position of the storage battery holding device 90, and move the storage batteries 14 collected from the carrying machine 10 to the storage battery holding device 90. The storage battery holding device 90 charges the storage batteries. In doing so, the storage batteries 14 of the carrying machine 10 are replaced.

The storage batteries 14 included in the carrying machine 10 may not be attachable/detachable. In this case, the storage battery handling device EX may charge the storage batteries 14 included in the carrying machine 10.

In the present embodiment, the carrying machine 10 travels by the storage batteries 14, and thus the discharged storage batteries 14 are replaced with the charged storage batteries 14 using the storage battery replacing device EX in the space SP. As described above, the loading machine 30 is supplied with the power through the feed cable 5 illustrated in FIG. 3 and the like, so that the rotation roller 33, the feeder 31, and the like are operated. The loading machine 30 itself moves in the underground, and thus travels to move to a different draw point DP. In this case, the loading machine 30 is detached from the feed cable 5. Therefore, the loading machine 30 includes a storage battery for driving the travel motors 48L and 48R illustrated in FIG. 17. This storage battery is charged with the power supplied through the feed cable 5 when the loading machine 30 excavates the ore MR at the draw point DP and conveys the ore MR. The storage battery of the loading machine 30 is replaced in the maintenance space MS in the space SP when performance is decreased than an allowable value due to use, for example.

<Route Where Carrying Machine Travels>

Figure 19:
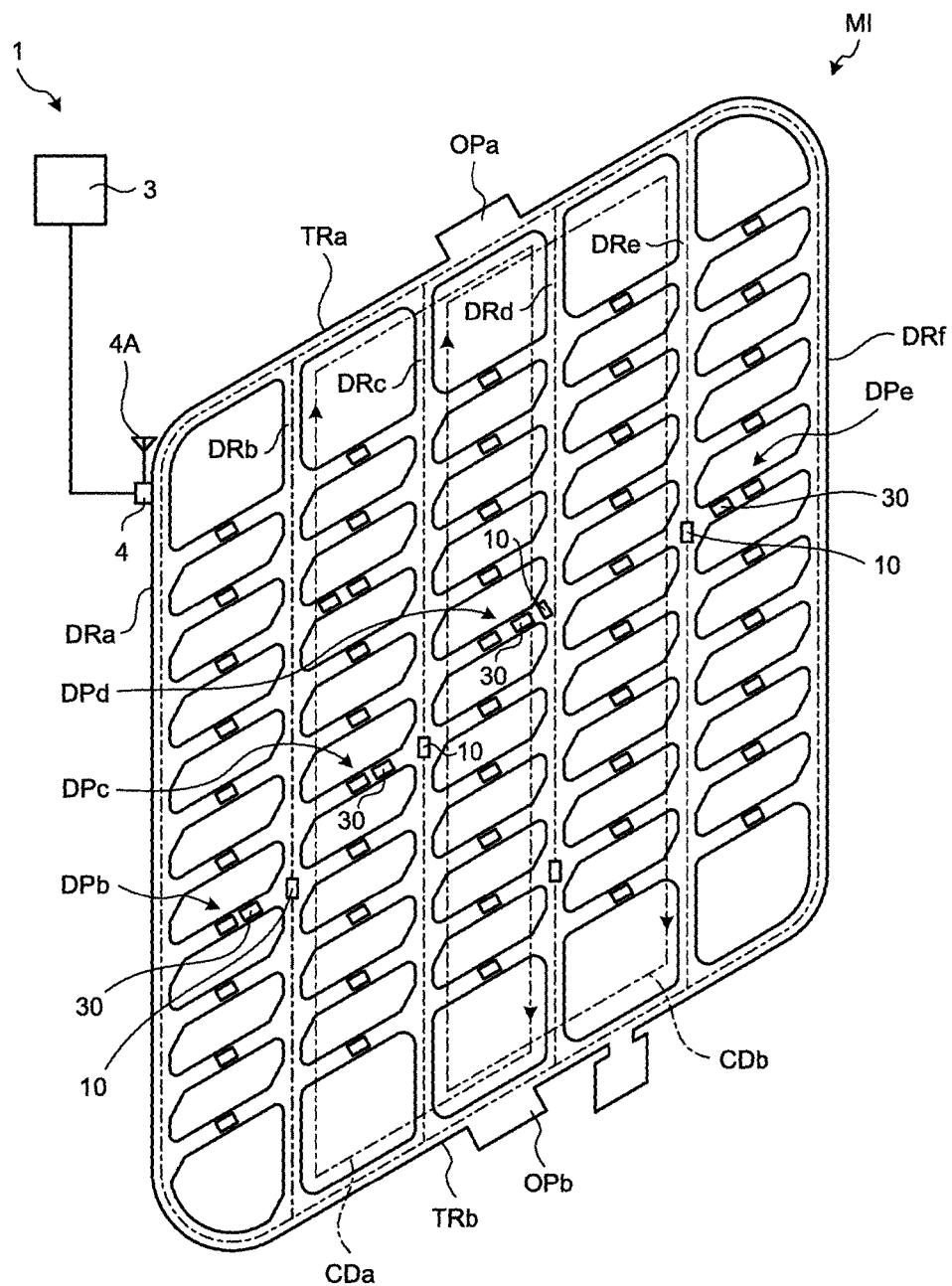
FIG. 19 is a diagram illustrating a direction in which the carrying machine proceeds in a drift in the underground in the mine mining system according to the present embodiment.

FIG. 19 is a diagram illustrating a direction into which the carrying machine 10 proceeds in the drift DR in the underground MI in the mine management system 1 according to the present embodiment. In the following description, when distinguishing the plurality of drifts DR, the plurality of outer peripheral roads TR, the plurality of draw points DP, or the plurality of ore paths OP provided in the underground MI, reference signs a, b, and the like are put to the reference signs DR, TR, DP, or OP. When not distinguishing the plurality of drifts DR, the plurality of outer peripheral roads TR, the plurality of draw points DP, or the plurality of ore paths OP, the reference signs a, b, and the like are not put.

In the mine mining system 1 illustrated in FIG. 19, six drifts DRa, DRb, DRc, DRd, DRe, and DRf and two outer peripheral roads TRa and TRb are formed in the underground. In the present embodiment, the drifts DR and the outer peripheral roads TR form circumduction roads CD. To be specific, a plurality of the drifts DR and a plurality of the outer peripheral roads TR are connected, so that one circumduction road CD is formed. For example, the two drifts DRb and DRd and the two outer peripheral roads TRa and TRb form a circumduction road CDa. Further, the two drifts DRc and DRe and the two outer peripheral roads TRa and TRb form a circumduction road CDb. As described above, in the present embodiment, two drifts DR and two outer peripheral roads TR form one circumduction road CD. In this case, one circumduction road CD is formed of two drifts DR and two outer peripheral roads TR. Here, the two drifts DR included in the one circumduction road CD have different travelable directions from each other.

One loading machine 30 is arranged in one drift DR. To increase a production amount, a plurality of the loading machines 30 may be arranged in one drift DR.

In a case where the carrying machine 10 is loaded with the ore MR mined at the draw point DP, and discharges the ore MR to the ore path OP, the circumduction road CD where the carrying machine 10 travels is favorably formed to include at least one of an ore path OPa and an ore path OPb. The circumduction road CD where the carrying machine 10 travels, the carrying machine 10 being not loaded with the ore MR and heading to the storage battery replacing device EX installed in the space SP to replace the storage battery 14 illustrated in FIGS. 7 and 8, may not include the ore path OPa and the ore path OPb. The management device 3 can arbitrarily generate the circumduction road CD for each carrying machine 10. For example, the management device 3 may generate the circumduction road CD according to the state of the carrying machine 10. As an example, the management device 3 can generate the shortest circumduction road CD from the current position to the space SP, assuming that the carrying machine 10 is going to replace the storage battery 14 in the storage battery replacing device EX, in a case where the capacity of the storage battery 14 included in the carrying machine 10 falls below a predetermined threshold, and the carrying machine 10 is not loaded with the ore MR on the vessel 11.

The carrying machine 10 traveling in the drift DR travels in the circumduction road CD in the same direction. In the present embodiment, the carrying machine 10 clockwisely travels in the circumduction road CD. In the course of traveling, the carrying machine 10 is loaded with the ore MR at the draw point DP by the loading machine 30. The carrying machine 10 then discharges the loaded ore MR to the ore path OPa or the ore path OPb. For example, the carrying machine 10 traveling in the circumduction road CDa receives the load of the ore MR from the loading machine 30 at a draw point DPb continuing to the drift DRb. Following that, the carrying machine 10 travels in the drift DRb and the outer peripheral road TRa, and discharges the ore MR to the ore path OPa provided adjacent to the outer peripheral road TRa. The carrying machine 10 that has discharged the ore MR travels in the drift DRd, and receives the load of the ore MR from the loading machine 30 at a draw point DPd continuing to the drift DRd. Following that, the carrying machine 10 travels in the drift DRd and the outer peripheral road TRb, and discharges the ore MR to the ore path OPb provided adjacent to the outer peripheral road TRb.

The carrying machine 10 traveling in the circumduction road CDb receives the load of the ore MR from the loading machine 30 at a draw point DPc continuing to the drift DRc. Following that, the carrying machine 10 travels in the drift DRc and the outer peripheral road TRa, and discharges the ore MR to the ore path OPa provided adjacent to the outer peripheral road TRa. The carrying machine 10 that has discharged the ore MR travels in the drift DRe, and receives the load of the ore MR from the loading machine 30 at a draw point DPe continuing to the drift DRe. Following that, the carrying machine 10 travels in the drift DRe and the outer peripheral road TRb, and discharges the ore MR to the ore path OPb provided adjacent to the outer peripheral road TRb.

As described above, the carrying machine 10 travels in the circumduction road CD in one direction, and thus passing each other of the carrying machines 10 can be minimized, compared with a case where the carrying machines 10 go and return between the draw point DP and the ore path OP. Further, if the circumduction road CD includes both of the ore path OPa and the ore path OPb, the carrying machine 10 can load and discharge the ore MR twice during traveling in the circumduction road CD once. Therefore, a conveyance amount of the ore MR can be made large. As a result, the mine management system 1 can improve cycle time, and can enhance productivity of the mine. Further, the carrying machine 10 travels in the circumduction road CD in one direction, and thus passing each other of the carrying machines 10 can be suppressed. Therefore, the number of places necessary for the passing each other can be decreased. Further, if the passing each other is not necessary, the places necessary for the passing each other may not be provided. As a result, it is not necessary to make the width of the roadway large more than is necessary, and thus a labor, a time, and a cost to excavate the roadway can be suppressed.

In the present embodiment, the direction into which the carrying machine 10 and the like travel in each of the drifts DR is determined to one direction (one-way) for each drift DR. That is, in each of the drifts DR, the carrying machine 10 and the like can travel in one direction. In a case where the carrying machine 10 and the like clockwisely travels in the circumduction road CD, for example, the traveling direction of the drift DRb included in the circumduction road CDa is a direction from the ore path OPb toward the ore path OPa. In this case, the carrying machine 10 cannot travel in the drift DRb from the ore path OPa toward the ore path OPb.

In a case where the carrying machine 10 and the like travel in the circumduction road CD in one direction, the management device 3 generates the circumduction road CD such that the carrying machine 10 does not pass another carrying machine or loading machine 30 in each of the drifts DR. For example, in a case of generating the circumduction road CD, the management device 3 cannot generate the circumduction road CD such that the carrying machine 10 goes down the wrong way on the drift DR, the traveling direction of which has been determined to one direction because the drift DR is included in the already generated circumduction road CD. In a case of generating new circumduction road CD using the drift DR included in the already generated circumduction road CD, the management device 3 causes the traveling direction of the new circumduction road CD accords with the traveling direction of the drift DR included in the already generated circumduction road CD. In doing so, passing each other of the carrying machines 10 in the circumduction road CD can be decreased or avoided.

In the mine management system 1, the six drifts DR are connected to the outer peripheral road TRa provided with the ore path OPa, and the six drifts DR are connected to the outer peripheral road TRb provided with the ore path OPb. In the direction into which the outer peripheral road TRa extends, the same number (three in the present embodiment) of the drifts DR is connected to the outer peripheral road Dra in any direction based on the ore path OPa. Similarly, in the direction into which the outer peripheral road TRb extends, the same number (three in the present embodiment) of the drifts DR is connected to the outer peripheral road TRb in any direction based on the ore path OPb. In such a mine management system 1 including the drifts DR and the outer peripheral roads TR, examples of the circumduction road CD that includes both of the ore path OPa and the ore path OPb include following nine patterns:

(1) Pattern 1: the drift DRa, the outer peripheral road TRa, the drift DRf, and the outer peripheral road TRb;
(2) Pattern 2: the drift DRa, the outer peripheral road TRa, the drift DRe, and the outer peripheral road TRb;
(3) Pattern 3: the drift DRa, the outer peripheral road TRa, the drift DRd, and the outer peripheral road TRb;
(4) Pattern 4: the drift DRb, the outer peripheral road TRa, the drift DRf, and the outer peripheral road TRb;
(5) Pattern 5: the drift DRb, the outer peripheral road TRa, the drift DRe, and the outer peripheral road TRb;
(6) Pattern 6: the drift DRb, the outer peripheral road TRa, the drift DRd, and the outer peripheral road TRb;
(7) Pattern 7: the drift DRc, the outer peripheral road TRa, the drift DRf, and the outer peripheral road TRb;
(8) Pattern 8: the drift DRc, the outer peripheral road TRa, the drift DRe, and the outer peripheral road TRb; and
(9) Pattern 9: the drift DRc, the outer peripheral road TRa, the drift DRd, and the outer peripheral road TRb.

In the mine management system 1, the carrying machine 10 travels in one direction (for example, in a clockwise manner) in any of the circumduction roads CD, whereby the passing each other of the carrying machines 10 can be minimized, and the carrying machine 10 can load and discharge the ore MR twice while traveling in the circumduction road CD once. In the present embodiment, the positions and the numbers of the ore paths OP provided in the respective outer peripheral roads TR are not limited. In a case where a plurality of the drifts DR is connected to a pair of the outer peripheral roads TR, and one ore path OP is provided in each of the outer peripheral roads TR, the number of patterns of the circumduction roads CD can be increased if the same numbers of drifts DR are respectively connected to the directions into which the outer peripheral roads TR extend based on the ore paths OP. Therefore, it is favorable.

<Setting of Work Mode in Underground>

Next, a method of managing the mine M by the management system 1 according to the present embodiment will be described. In the mine, there are demands to perform work in a production system based on various indexes. For example, there is case of performing work, valuing an index of a mining amount (production amount) of the ore MR per unit time. There is a case of performing work, valuing indexes of energy consumption of the carrying machine 10 and the loading machine 30. There is a case of performing work, valuing indexes of maintenance cost of the road surface in the underground MI, the loading machine 30, and the carrying machine 10.

In the present embodiment, a plurality of work modes to value the above-described indexes is determined. The plurality of work modes are determined in consideration of mining cost per unit weight of the ore MR ($/t) and a mining amount of the ore MR per unit time (t/h).

In the present embodiment, a production amount valuing mode that prioritizes the mining amount (production amount) of the ore MR per unit time, an energy saving mode that prioritizes suppression of energy consumption of the carrying machine 10 and the loading machine 30, and a maintenance cost saving mode that prioritizes suppression of maintenance cost of the road surface in the underground MI, the loading machine 30, and the carrying machine 10.

Further, in the present embodiment, as the production amount valuing mode, a production maximizing mode that maximizes the mining amount of the ore MR per unit time and a production amount smoothing mode that suppresses variation of the mining amount of the ore MR are determined.

That is, in the present embodiment, the five work modes including:

(p1) a production amount maximizing mode (the production amount valuing mode);
(p2) a production amount leveling mode (production amount valuing mode);
(e) the energy saving mode;
(m1) the maintenance cost saving mode of the road surface; and
(m2) the maintenance cost saving mode of the carrying machine 10 and loading machine 30, are prepared.

The production amount maximizing mode (p1) is a mode to maximize a loading amount of the loading machine 30 and a carrying capacity of the carrying machine 10, and enhance vehicle allocation efficiency to maximize the production amount. The production amount is functions of "a processing capacity [t/h] of the loading machine 30×the number of the loading machines 30×the loading efficiency" and "a processing capacity [t/h] of the carrying machine 10×the number of the carrying machines 10×the carrying efficiency (vehicle allocation efficiency)".

The production amount leveling mode (p2) is a mode to suppress variation of [t/h]. It becomes not necessary to arrange a facility and personnel distribution of a post-process based on a peak of [t/h] by suppressing the peak to suppress the variation. In the production amount leveling mode (p2), in normal times when the plurality of carrying machines 10 is normally operable, the processing capacities (carrying capacities) of the respective carrying machines 10 are suppressed. Accordingly, the production amount in the underground MI is suppressed. In abnormal times such as breakdown of the carrying machine 10 or at the time of maintenance of the carrying machine 10, when the number of normally operable carrying machines 10 is decreased, the processing capacities of the normally operable carrying machines 10 are enhanced. Accordingly, a decrease in the production amount is suppressed, and the production amounts are leveled.

The energy saving mode (e) is a mode to suppress energy consumption while achieving a target production amount and a target operation time. In the energy saving mode, suppression of the energy cost per mining amount is achieved by suppression of the acceleration and deceleration of the carrying machine 10, suppression of the operation of the working machine of the loading machine 30, and the like.

The maintenance cost saving mode (m1 and m2) is a mode to suppress the maintenance cost while achieving the target production amount and the target operation time. In the maintenance cost saving mode (m1) of the road surface in the underground MI, for example, substantial deterioration of a specific road surface is suppressed by a decrease in a total travel distance (gross travel distance) of the carrying machine 10 that travels on the specific road surface, averaging of the numbers of times of passage of the carrying machine 10 in the plurality of drifts DR, and the like, so that suppression of the maintenance cost of the road surface is achieved. In the maintenance cost saving mode (m2) of the loading machine 30, for example, the abrasion of members of the loading machine 30 is suppressed by limitation of the excavation force, so that suppression of the maintenance cost of the loading machine 30 is achieved. In the maintenance cost saving mode (m2) of the carrying machine 10, for example, loads applied to the wheels 12A and 12B are suppressed by limitation of the loading amount of the vessel 4, so that suppression of the maintenance cost of the carrying machine 10 is achieved.

Figure 20:
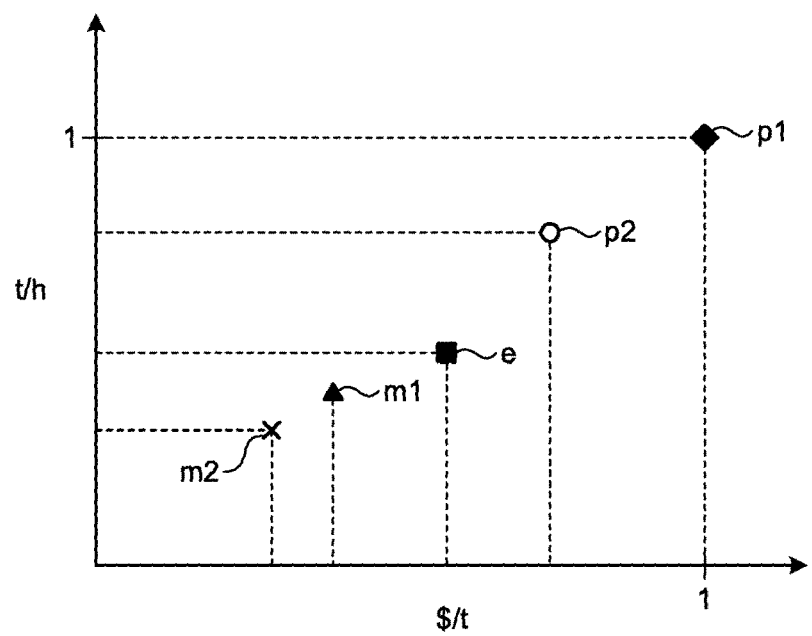
FIG. 20 is a diagram illustrating a relationship between a work mode and productivity of the mine according to the present embodiment.

FIG. 20 is a diagram illustrating a relationship between the mining cost per unit weight of the ore MR ($/t), the mining amount of the ore MR per unit time (t/h), and the above-described plurality of work modes (p1, p2, e, m1, and m2).

In the graph illustrated in FIG. 20, the horizontal axis represents the mining cost per unit weight of the ore MR ($/t). The vertical axis represents the mining amount of the ore MR per unit time (t/h).

In the graph illustrated in FIG. 20, the production amount maximizing mode is illustrated by the point p1. The production amount leveling mode is illustrated by the point p2. The energy saving mode is illustrated by the point e. The maintenance cost saving mode of the road surface is illustrated by the point m1. The maintenance cost saving mode of the carrying machine 10 and the loading machine 30 is illustrated by the point m2. In FIG. 20, the mining cost per unit weight of the ore MR ($/t) and the mining amount of the ore MR per unit time (t/h) in the production amount maximizing mode p1 are 1.

The plurality of work modes (p1, p2, e, m1, and m2) is determined in consideration of the mining cost per unit weight of the ore MR ($/t) and the mining amount of the ore MR per unit time (t/h). In each of the work modes, a target value of "$/t" and a target value of "t/h" are determined in advance and are stored in the storage device 3M. The points (p1, p2, e, m1, and m2) illustrated in FIG. 20 are plotted based on the target values of "$/t" and the target values of the "t/h".

These work modes are selected by an operator (administrator). The administrator operates the input device 9 of the management device 3 such that one of the plurality of work modes is selected. The input device 9 generates an input signal according to the selected work mode. The processing device 3C of the management device 3 sets the work mode in the underground MI based on the input signal.

In the present embodiment, a work parameter of the carrying machine 10 and a work parameter of the loading machine 30 are determined such that the target value of "$/t" and the target value of "t/h" are achieved based on the selected work mode of the five work modes. The management device 3 sets one work mode from the plurality of work modes based on the input signal from the input device 9, and determines the work parameter of the carrying machine 10 and the work parameter of the loading machine 30 such that the target value of "$/t" and the target value of "t/h" are achieved based on the set (selected) work mode.

In the present embodiment, the plurality of work modes is determined in consideration of the mining cost per unit weight of the ore MR ($/t) and the mining amount of the ore MR per unit time (t/h). The work parameters are determined such that the target value of "$/t" and the target value of "t/h" corresponding to the selected work mode are achieved, and are stored in the storage device 3M. Therefore, the management device 3 can determine the work parameter of the carrying machine 10 and the work parameter of the loading machine 30 such that the target value of "$/t" and the target value of "t/h" are achieved based on the stored information of the storage device 3M and the set (selected) work mode. The management device 3 changes both of the work parameter of the carrying machine 10 and the work parameter of the loading machine 30 based on the determined work parameter of the carrying machine 10 and the determined work parameter of the loading machine 30. In the present embodiment, the management device 3 changes the work parameter of the carrying machine 10 and the work parameter of the loading machine 30 at the same time.

The work parameters include a parameter related to performance of the loading machine 30, a parameter related to performance of the carrying machine 10, a parameter related to the number of the carrying machines 10, and a parameter related to vehicle allocation of the carrying machine 10. These parameters are changed.

The work parameter of the carrying machine 10 includes a travel speed (vehicle speed) of the carrying machine 10 in the underground MI, acceleration (deceleration), and a loading amount of the ore MR on the vessel 11. Further, the work parameter of the carrying machine 10 includes a vehicle allocation parameter. The vehicle allocation parameter includes a moving route in the roadway R until the carrying machine 10 is moved to the loading area LA including the draw point DP and the loading position LP, and a moving route in the roadway R until the carrying machine 10 is moved to the ore path OP. Examples of the moving route include the above-described nine patterns (1) to (9) of the circumduction road, a circumduction direction (one direction of either a clockwise direction or a counterclockwise direction). Further, the vehicle allocation parameter includes selection of an ore path to which the carrying machine 10 heads, from the plurality of ore paths OPa and OPb. Further, the vehicle allocation parameter includes selection of the loading area LA to which the carrying machine 10 heads to, from the plurality of loading areas LA. Further, the vehicle allocation parameter includes the number of times when the carrying machine 10 passes through in one drift.

The work parameter of the loading machine 30 includes at least one of a travel speed (vehicle speed) of the loading machine 30 (traveling device 34) in the underground MI, a loading speed of the ore MI onto the carrying machine 10, and excavation force. The loading speed includes a speed of the feeder 31 (including a rotating speed of the rotation roller 33). The excavation force includes intrusive force by the intruding member 35 and rotation force of the rotation body 34. Further, the work parameter of the loading machine 30 includes the vehicle allocation parameter. The vehicle allocation parameter includes the number of the loading machines 30 arranged in one drift DR, selection of the draw point DP to which the loading machine 30 heads, of the plurality of draw points DP, and a moving route in the roadway R until the loading machine 30 is moved from a certain draw point DP to another draw point DP. The moving route includes the above-described nine patterns (1) to (9) of the circumduction road, and the circumduction direction (one direction of either the clockwise direction or the counterclockwise direction).

Figure 21:
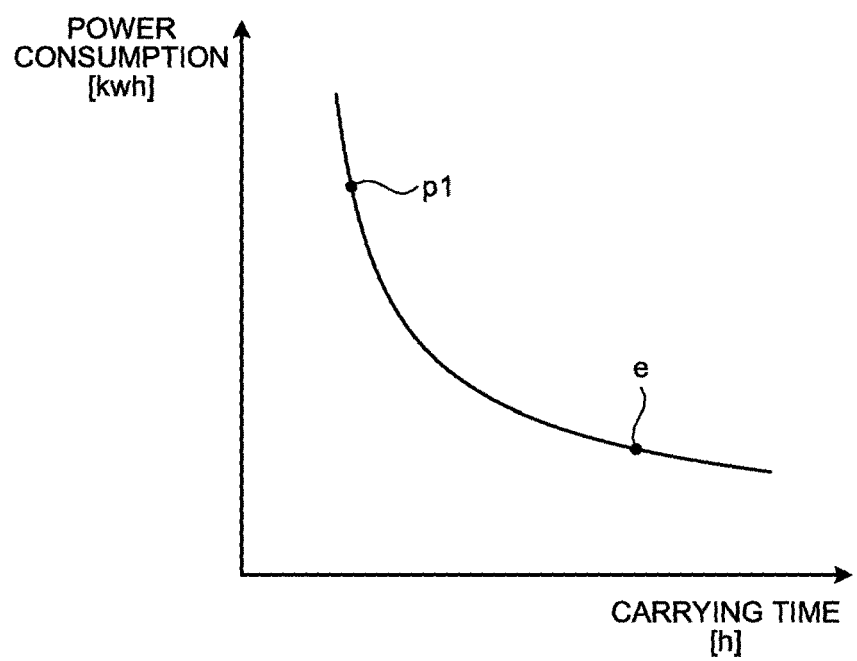
FIG. 21 is a diagram for describing an example of a work parameter of the carrying machine according to the present embodiment.

FIG. 21 is a diagram for describing an example of the work parameter of the carrying machine 10. In the graph illustrated in FIG. 21, the horizontal axis represents a carrying time (time: h) of the ore MR by the carrying machine 10 from the loading area LA to the earth removal area OP. The vertical axis represents power consumption (kilowatt hour: kwh) of the carrying machine 10.

In a case where the production amount maximizing mode (p1) is selected, the work parameters such as the travel speed of the carrying machine 10, the acceleration (deceleration), and the loading amount are determined such that the target value of "$/t" and the target value of "t/h" in the production amount maximizing mode (p1) are achieved. The carrying machine 10 performs work based on the determined work parameters, so that the target value of "$/t" and the target value of "t/h" can be achieved in a short carrying time, as illustrated by the point p1 of FIG. 21.

In a case where the energy saving mode (e) is selected, the work parameters such as the travel speed of the carrying machine 10, the acceleration (deceleration), and the loading amount are determined such that the target value of "$/t" and the target value of "t/h" in the energy saving mode (e) are achieved. The carrying machine 10 performs work based on the determined work parameters, so that the target value of "$/t" and the target value of "t/h" can be achieved with low power consumption, as illustrated by the point e of FIG. 21.

In the production amount maximizing mode (p1), the travel speed is set to be a high value, the acceleration and the deceleration are also set to high values, and the loading amount is also set to be a high (large) value. Accordingly, high production amount can be obtained. Meanwhile, if the travel speed, the acceleration, the deceleration, and the loading amount are increased, the power consumption becomes large. That is, in the production amount maximizing mode (p1), although high production amount is achieved, the power consumption becomes a high value.

In the energy saving mode (e), the travel speed is set to a low value, the acceleration and the deceleration are also set to low values, and the loading amount is also set to a low (small) value. Accordingly, the power consumption can be suppressed. Meanwhile, if the travel speed, the acceleration, the deceleration, and the loading amount are decreased, the production amount becomes low. That is, in the energy saving mode (e), although low power consumption can be achieved, the production amount becomes a low value.

Figure 22:
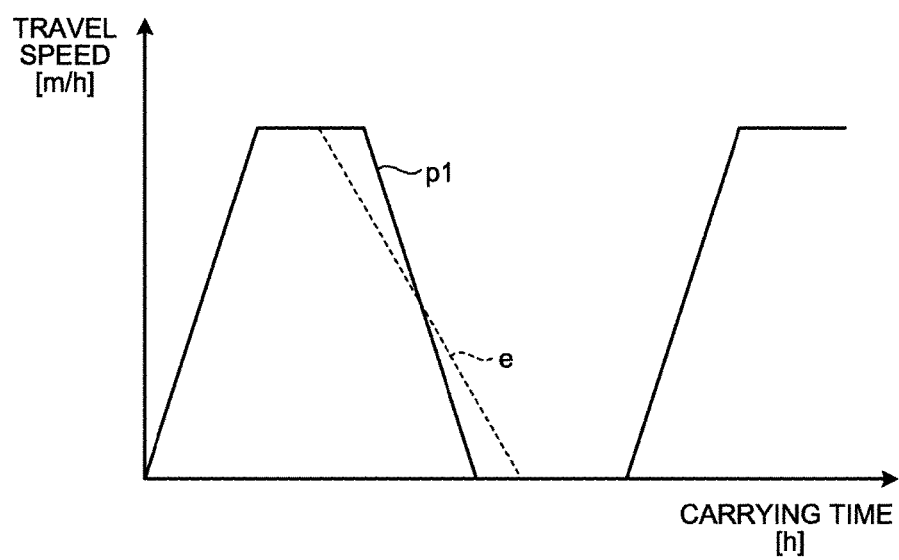
FIG. 22 is a diagram for describing an example of a work parameter of the carrying machine according to the present embodiment.

FIG. 22 is a diagram for describing an example of the work parameter of the carrying machine 10. In the graph illustrated in FIG. 22, the horizontal axis represents a carrying time (time: h) of the ore MR by the carrying machine 10. The vertical axis represents a travel speed (speed per hour: m/h) of the carrying machine 10.

The line p1 illustrated in FIG. 22 is a speed profile of the carrying machine 10 in the production amount maximizing mode (p1). The line e illustrated in FIG. 22 is a speed profile of the carrying machine 10 in the energy saving mode (e). The speed profile refers to travel speed data associated with an elapsed time from a certain point of time.

As illustrated in FIG. 22, while the maximum values of the travel speeds (maximum speeds) of the carrying machine 10 are equal in the production amount maximizing mode (p1) and the energy saving mode (e), the acceleration of the deceleration of the carrying machine 10 in the production amount maximizing mode (p1) are larger than those of the carrying machine 10 in the energy saving mode (e). Therefore, in the production amount maximizing mode (p1), a time required for the carrying machine 10 to travel by predetermined distance can be short. Therefore, the production amount becomes high. The acceleration and the deceleration of the carrying machine 10 in the energy saving mode (e) are smaller than those of the carrying machine 10 in the production amount maximizing mode (p1). Therefore, in the energy saving mode (e), a time required for the carrying machine 10 to travel by predetermined distance becomes long, but the power consumption can be suppressed.

Figure 23:
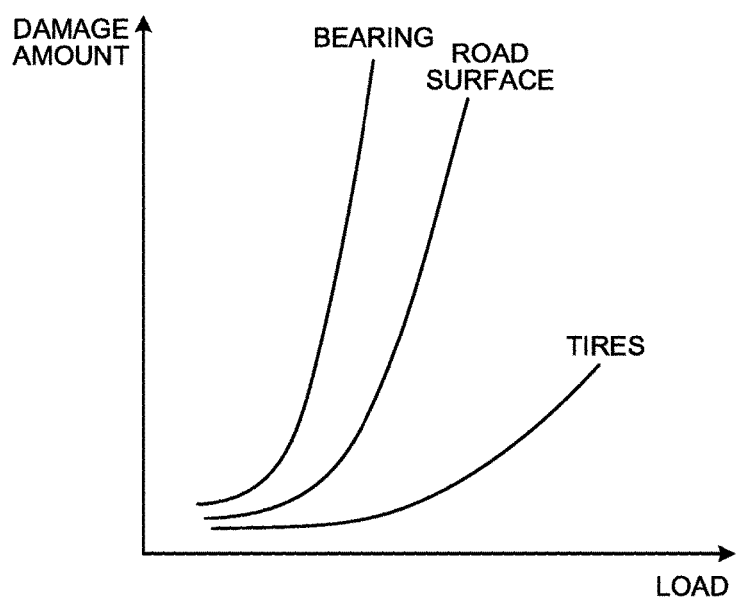
FIG. 23 is a diagram for describing an example of a work parameter of the carrying machine according to the present embodiment.

FIG. 23 is a diagram for describing an example of the work parameter of the carrying machine 10. In the graph illustrated in FIG. 23, the horizontal axis represents loads respectively applied to tires of the wheels 12A and 12B of the carrying machine 10, a bearing that rotatably supports the wheels 12A and 12B, and the road surface in the underground MI, the road surface being in contact with the tires of the wheels 12A and 12B. The vertical axis represents damage amounts of the tires, the bearing, and the road surface. The damage amount means an abrasion loss or the degree of deterioration. The damage amount means a state where a product life becomes shorter as the damage amount is larger.

The loads applied to the tires, the bearing, and the road surface are changed according to the travel speed, the acceleration, the deceleration, and the loading amount of the carrying machine 10. The loads applied to the tires, the bearing, and the road surface become larger as the travel speed, the acceleration, and the deceleration are higher. Further, the loads applied to the tires, the bearing, and the road surface become larger as the loading amount is larger. When the load becomes large, the damage amount is increased. When the damage amounts of the tires and the bearing are increased, the frequency to replace the tires and the bearing becomes high, and the maintenance cost of the carrying machine 10 including the tires and the bearing becomes high. When the damage amount of the road surface becomes large, the frequency to repair the road surface becomes high, and the maintenance cost of the road surface becomes high.

In a case where the production amount maximizing mode (p1) is selected, the work parameters of the carrying machine 10 including the travel speed, the acceleration, the deceleration, and the loading amount are set to high values. Accordingly, in the production amount maximizing mode (p1), high production amount can be obtained. Meanwhile, in the production amount maximizing mode (p1), the damage amount becomes large, and the maintenance cost becomes high.

In a case where the maintenance cost saving mode (m1) of the road surface is selected, the work parameters of the carrying machine 10 including the travel speed, the acceleration, the deceleration, and the loading amount are set to low values. Accordingly, in the maintenance cost saving mode (m1) of the road surface, the damage amount of the road surface is suppressed, and the maintenance cost of the road surface is suppressed. Meanwhile, in the maintenance cost saving mode (m1) of the road surface, the production amount becomes low.

In a case where the maintenance cost saving mode (m2) of the carrying machine 10 is selected, the work parameters of the carrying machine 10 including the travel speed, the acceleration, the deceleration, and the loading amount are set to low values. Accordingly, in the maintenance cost saving mode (m2) of the carrying machine 10, the damage amounts of the tires and the bearing are suppressed, and the maintenance cost of the carrying machine 10 is suppressed. Meanwhile, in the maintenance cost saving mode (m2) of the carrying machine 10, the production amount becomes low.

Figure 24:
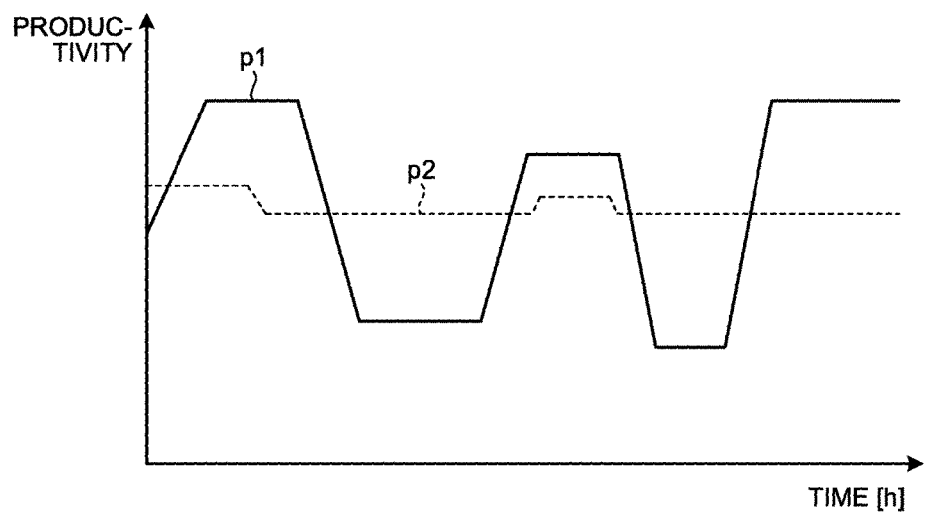
FIG. 24 is a diagram for describing an example of a relationship between a work mode and a work parameter of the carrying machine according to the present embodiment.

FIG. 24 illustrates an example of the work parameters of the carrying machine 10 in the production amount maximizing mode (p1) and the production amount leveling mode (p2). In the production amount maximizing mode (p1), for example, the work parameters are set such that the production amount (the travel speed, the acceleration, the deceleration, and the loading amount of the carrying machine 10 in the drift DR) in each of the four drifts DR is maximized.

In the production amount leveling mode (p2), for example, the production amount in each of the four drifts DR is not maximized, and the travel speed, the acceleration, the deceleration, and the loading amount of the carrying machine 10 in the drift DR are set with sufficient margin for the maximum production capacity in the drift DR.

There is a possibility that one of the four drifts DR (the loading machine 30 in the drift DR) becomes inoperable from any cause when working in the production amount maximizing mode (p1). In that case, a decrease amount (variation amount) of the production amount in the entire underground MI becomes large.

When one of the four drifts DR (the loading machine 30 in the drift DR) becomes inoperable when working in the production amount leveling mode (p2), the production amounts in the remaining three drifts are increased so that the variation amount of the production amount in the entire underground MI is suppressed. As described above, in the production amount leveling mode (p2), the production amount in the drift DR is not maximized, and the travel speed, the acceleration, the deceleration, and the loading amount of the carrying machine 10 in the drift DR are set with sufficient margin for the maximum production capacity. Therefore, when one of the four drifts becomes inoperable, the production amounts in the remaining three drifts DR are increased, so that the variation amount of the production amount in the entire underground MI is suppressed.

When the production amounts are leveled, work loads of a crasher can be leveled in a post-process of the mining (a crushing process by the crusher, for example) can be leveled. If the work loads are not leveled, a crusher that supports the maximum production capacity needs to be prepared. As described above, if one drift DR becomes inoperable, the production amount with the maximum production capacity cannot be obtained, and the crusher is spoiled and becomes waste. If the work loads are leveled, no waste is caused.

The production amount is changed according to the vehicle allocation parameter. For example, if a plurality of the carrying machines 10 arrives at one ore path OP at a time, a traffic jam is caused, and as a result, the production amount may be decreased. Further, if a plurality of the carrying machines 10 arrives at one loading area LA at a time, a traffic jam is caused, and as a result, the productivity may be decreased. Therefore, to suppress occurrence of the traffic jam, the moving routes of the plurality of carrying machines 10 are adjusted, or the ore path OP to which each of the plurality of carrying machines 10 heads is selected so that the plurality of carrying machines 10 does not rush to one ore path (for example, the ore path OPa), of the plurality of ore paths OP (OPa and OPb). Further, the loading area LA to which each of the plurality of carrying machines 10 heads is selected so that the plurality of carrying machines 10 does not rush to one loading area LA. Further, occurrence of the traffic gam is suppressed by adjustment of the circumduction direction (the clockwise direction or the counterclockwise direction). Further, occurrence of the traffic jam is suppressed by adjustment of the travel speed, the acceleration, and the deceleration of each of the plurality of carrying machines 10.

Further, the maintenance cost of the road surface is changed according to the vehicle allocation parameter. For example, when the carrying machine 10 passes through one drift DR many times, the damage amount of the drift DR becomes large. Therefore, in a case where the maintenance cost saving mode (m1) of the road surface is selected, the vehicle allocation parameter is determined such that the carrying machines 10 do not pass through one drift DR in a concentrated manner, and the numbers of times of passage of the carrying machine 10 can be averaged among the four drifts DR. Meanwhile, if the numbers of times of passage of the carrying machine 10 are averaged among the four drifts DR, the production amount may be decreased. Therefore, in a case where the production amount maximizing mode (p1) is selected, the vehicle allocation parameter is determined without considering averaging of the numbers of times of passage of the carrying machine 10, to enhance the production amount enhance.

Further, the maintenance cost of the carrying machine 10 and the loading machine 30 is changed according to the vehicle allocation parameter. For example, when the vehicle allocation is performed such that operating ratios of the carrying machine 10 and the loading machine 30 can be maximized, the moving distance of the carrying machine 10 and the loading machine 30 becomes long. Therefore, in a case where the maintenance cost saving mode (m2) of the carrying machine 10 and the loading machine 30 is selected, the vehicle allocation parameter is determined such that the moving distance of the carrying machine 10 and the loading machine 30 becomes short. Meanwhile, if the moving distance of the carrying machine 10 and the loading machine 30 becomes short, the production amount may be decreased. Therefore, in a case where the production amount maximizing mode (p1) is selected, the vehicle allocation parameter is determined such that the moving distance of the carrying machine 10 and the loading machine 30 becomes long, to enhance the production amount.

Table 1 illustrates relationship between the work parameter, and the work parameters of the loading machine 30 and the work parameters of the carrying machine 10.

TABLE 1

| | | Work parameters of loading machine (capacities) | | | | Work parameters of carrying machine (capacities) | |
|---|---|---|---|---|---|---|---|
| | | Travel speed | Feeder speed | Working machine speed | Excavation force | Travel speed | Acceleration/deceleration |
| Production amount valuing mode | Production amount maximizing mode (p1) | Maximum: Move to next loading area in shortest time | Maximum: Maximize loading amount | ← | ← | Maximum | ← |
| | Production amount leveling mode (p2) | Middle to Large: Perform adjustment to target production amount | ← | ← | ← | Middle to Large: Perform adjustment according to target production amount | ← |
| Energy saving mode (e) | | Middle: Decrease vehicle speed to decrease friction | Middle: Decrease feeder speed to decrease friction | Middle: Decrease working machine speed and make moving amount small | Middle: Decrease excavation force | Middle: Use fuel-efficient engine speed and torque | Middle: Predict state of route destination and decelerate early |
| Maintenance cost saving mode | Maintenance cost saving mode of road surface (m1) | Middle: Decrease vehicle speed to reduce skid | Middle: Decrease feeder speed to decrease friction | Middle: Avoid damage of road surface by reaction force of working machine | ← | Middle: Adjust track so that no wheel track occurs | Middle: Suppress acceleration/deceleration to decrease road surface load and vehicle load |
| | Maintenance cost saving mode of loading machine and carrying machine (m2) | Middle: Decrease skid | Middle: Decrease feeder speed to decrease friction | Middle: Decrease working machine speed and make moving amount small | Middle: Decrease excavation force to decrease friction | Middle: Decrease frame load due to vibration and decrease tire TKPH | |

| | | Work parameters of carrying machine (capacities) | Work parameter of loading machine (vehicle allocation) | Work parameters of carrying machine (vehicle allocation) | | |
|---|---|---|---|---|---|---|
| | | Loading amount | | Moving route | Circumduction direction | Selection of loading area and earth removal area |
| Production amount valuing mode | Production amount maximizing mode (p1) | ← | Value difference between production plan and actual production amount (Δ production amount) | Maximize operability of loading vehicle or carrying vehicle | One direction | Use earth removal area where earth removal start time is minimized |
| | Production amount leveling mode (p2) | ← | ↑ | ↑ | ↑ | ↑ |
| Energy saving mode (e) | | Middle: Causing loading amount to fixed amount or less to improve fuel efficiency | Prioritize loading area in small moving distance | Prioritize loading area in small moving distance | Change circumduction direction so that distance in loading ore becomes short (by seeing entire carrying vehicles) | ↑ |
| Maintenance cost saving mode | Maintenance cost saving mode of road surface (m1) | Middle: Causing load amount to fixed amount or less to decrease road surface load and vehicle load | Value Δ production amount | Average the number of times of passage of drift | ↑ | Prioritize earth removal area in small moving distance |

TABLE 1-continued

| | | | |
|---|---|---|---|
| Maintenance cost saving mode of loading machine and carrying machine (m2) | Prioritize distance | Prioritize distance ↑ | ↑ |

In the present embodiment, the management system 1 changes both of the work parameter of the carrying machine 10 and the work parameter of the loading machine 30 based on the selected work mode (p1, p2, e, m1, or m2). In the present embodiment, the management system 1 changes the work parameter of the carrying machine 10 and the work parameter of the loading machine 30 at the same time. For example, in a case where an input signal that indicates the energy saving mode (e) is input through the input device 9, in the underground MI where work is being performed in the production amount maximizing mode (p1), the management device 3 decreases the work parameter of the loading machine 30 at the same time as decreasing the travel speed that is the work parameter of the carrying machine 10.

Figure 25:
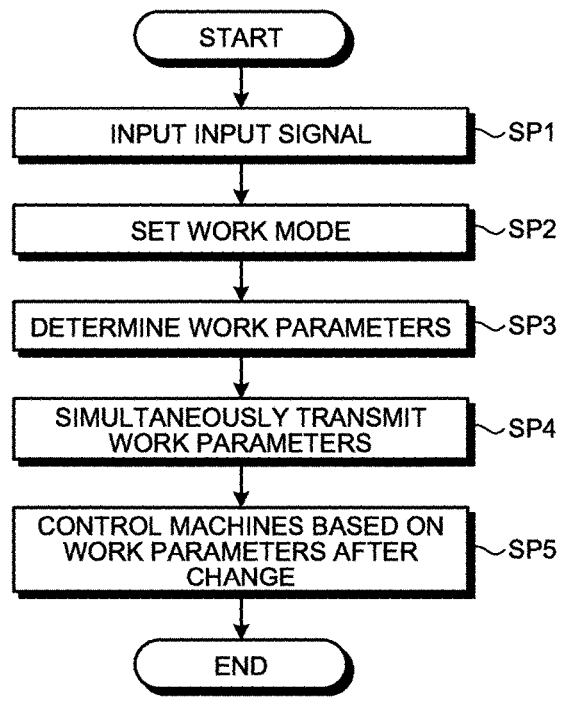
FIG. 25 is a flowchart illustrating an example of processing of the management system according to the present embodiment.

Next, an example of a procedure to set the work parameters and change of the work parameters according to the present embodiment will be described with reference to the flowchart of FIG. 25.

The input device 9 is operated by the administrator to set the work mode. Setting of the work mode includes at least one of new setting, re-setting, and setting for change. For example, the input signal indicating the energy saving mode (e) is input to the processing device 3C through the input device 9, for the underground MI in which the work is being performed in the production amount maximizing mode (p1) (step SP1).

The processing device 3C sets the work mode in the underground MI to the energy saving mode (e) based on the input signal (step SP2).

The processing device 3C determines the work parameter of the carrying machine 10 and the work parameter of the loading machine 30 such that the target value of "$/t" and the target value of "t/h", which are determined in advance corresponding to the energy saving mode (e), are achieved (step SP3).

The management device 3 simultaneously transmits the work parameters determined in the processing device 3C to the plurality of loading machines 30 and the plurality of carrying machines 10 in the underground MI through the wireless communication device 4 (step SP4).

The control device 75 (see FIG. 17 and the like) of the loading machine 30 receives the transmitted work parameter. The control device 75 changes the work parameter used before the reception to the new work parameter. The control device 75 controls the loading machine 30 with the changed new work parameter (step SP5). For example, before the reception of the new work parameter, the feeder 31 driven at the first feeder speed is changed to have the second feed speed that is slower than the first feeder speed, for energy saving.

Similarly, the control device 70 (see FIG. 12 and the like) of the carrying machine 10 receives the transmitted work parameter. The control device 70 changes the work parameter used before the reception to the received new work parameter. The control device 70 controls the carrying machine 10 with the changed new work parameter. For example, before the reception of the new work parameter, the carrying machine 10 driven at the first travel speed is changed to have the second travel speed that is slower than the first travel speed, for energy saving.

As described above, according to the present embodiment, the plurality of work modes is prepared in advance, and the work mode can be selected according to a demand of the administrator. Therefore, the work can be smoothly performed in a production system that prioritizes various indexes in the mine. For example, a mode to decrease cost (the energy consumption or the maintenance cost) can be set, in place of suppressing the production amount, according to the demand of the administrator.

As described above, in the present embodiment, the management system 1 separates the functions of the loading machine 30 and the carrying machine 10 by causing the loading machine 30 to perform only the excavation and loading of the ore MR, and the carrying machine 10 to perform only carrying of the ore MR. Therefore, the loading machine 30 can be dedicated to the excavation work and conveyance work, and the carrying machine 10 can be dedicated to the carrying work. That is, the loading machine 30 may not have the function to carry the ore MR, and the carrying machine 10 may not have the functions to excavate and convey the ore MR. The loading machine 30 can be specialized in the functions of excavation and conveyance, and the carrying machine 10 can be specialized in the function to carry the ore MR, and thus can exhibit the respective functions as much as possible. As a result, the mine management system 1 can enhance the productivity of the mine M.

In a case of setting the work mode to the carrying machine 10 and the loading machine 30 with separated functions, both of the work parameter of the carrying machine 10 and the work parameter of the loading machine 30 are changed. Therefore, a situation where the productivity is sharply decreased can be avoided. Further, the carrying machine 10 and the loading machine 30 can appropriately work based on the work mode according to the demand of the administrator.

Further, in the present embodiment, a plurality of the work modes is determined in consideration of the mining cost per unit weight of the ore MR ($/t), and the mining amount of the ore MR per unit time (t/h). The work parameters are determined in advance such that the target value of "$/t" and the target value of "t/h" corresponding to the selected work mode can be achieved, and stored in the storage device 3M. Therefore, the management device 3 can determine appropriate work parameters such that the target value of "$/t" and the target value of "t/h" corresponding to the selected work mode can be achieved based on the selected work mode and the stored information of the storage device 3M.

Further, in the present embodiment, as the work parameters, the work mode solely regarding the carrying machine 10 and the loading machine 30, such as the productivity valuing mode and the energy saving mode, and the work mode regarding the road surface (infrastructure) such as the maintenance saving mode are prepared. Accordingly, high productivity can be obtained while the cost of the entire mine is suppressed.

Note that, in the above-described embodiment, in the setting of the work mode, the work parameter of the carrying machine 10 and the work parameter of the loading machine 30 are changed at the same time. The work parameter of the carrying machine 10 and the work parameter of the loading machine 30 may not be changed at the same time. For example, after the work parameter of the carrying machine 10 is changed, the work parameter of the loading machine 30 may be changed. For example, if the work parameter of the loading machine 30 is changed while the loading machine 30 is performing the loading work of the load, the efficiency of the loading work may be decreased. Therefore, in a case where the input device 9 is operated to set the work parameter when the loading machine 30 is performing the loading work of the load, the management device 3 may change the work parameter of the carrying machine 10, and then change the work parameter of the loading machine 30 after the loading work of the loading machine 30 is completed.

Further, in a case where a command signal for changing the work parameters is simultaneously transmitted from the management device 3 to the carrying machine 10 and the loading machine 30, the control device 70 of the carrying machine 10 and the control device 75 of the loading machine 30 may change the work parameters at the same time, or may change the work parameters at different timing. For example, in a case where the command signal for changing the work parameter is transmitted from the management device 3 to the loading machine 30 when the loading machine 30 is performing the loading work of the load, the control device 75 of the loading machine 30 may immediately change the work parameter after receipt of the command signal, or may change the work parameter after receipt of the command and completion of the loading work. In a case where the command signal for changing the work parameter is transmitted from the management device 3 to the carrying machine 10, the control device 70 of the carrying machine 10 may immediately change the work parameter after receipt of the command signal, or may change the work parameter after the elapse of a predetermined time after receipt of the command signal.

Note that, in the above-described embodiment, as the excavation device of the loading machine 30, an example of using the rotation roller 33 has been described. However, the loading machine 30 may perform excavation and loading using a bucket with a tool edge.

Note that the above-described configuration elements include those easily conceived by a person skilled in the art, those substantially the same, and those fall within the scope of so-called equivalents. Further, the above-described configuration elements can be appropriately combined. Further, various omissions, replacements, and changes of the configuration elements can be performed without departing from the gist of the present embodiments.

REFERENCE SIGNS LIST

1 MANAGEMENT SYSTEM
3 MANAGEMENT DEVICE
3C PROCESSING DEVICE
3M STORAGE DEVICE
5 FEED CABLE
10 CARRYING MACHINE
10B VEHICLE BODY
11 VESSEL
12A and 12B WHEEL
14 STORAGE BATTERY
24 DRIVE CONTROL DEVICE
30 LOADING MACHINE
30B VEHICLE BODY
31 FEEDER
32 SUPPORT MECHANISM
33 ROTATION ROLLER
34 TRAVELING DEVICE
35 INTRUDING MEMBER
36 ROTATION BODY
40 and 41 INFORMATION COLLECTING DEVICE
48 DRIVE CONTROL DEVICE
70 and 75 CONTROL DEVICE
71 and 76 PROCESSING DEVICE
72 and 77 STORAGE DEVICE
80 SWITCHING MECHANISM
90 STORAGE BATTERY HOLDING DEVICE
CR CROSS CUT (SECOND ROADWAY)
CD, CDa, and CDb CIRCUMDUCTION ROAD
DP, DPa, DPb, DPc, and DPe DRAW POINT (MINING AREA)
DR, DRa, DRb, DRc, DRd, DRe, and DRf DRIFT (FIRST ROADWAY)
EX STORAGE BATTERY REPLACING DEVICE
OP, OPa, and OPb ORE PATH (EARTH REMOVAL AREA)
RM ROCK MASS
TR, TRa, and TRb OUTER PERIPHERAL ROAD (THIRD ROADWAY)

The invention claimed is:

1. A mine management system comprising:
a carrying machine configured to be loaded with ore and travel from a mining area located in an underground area of a mine to an earth removal area;
a loading machine configured to mine the ore in the mining area and load the ore onto the carrying machine; and
a management device configured to
store a plurality of work modes of the underground area, each work mode corresponding to valuing a different index,
select one work mode from the plurality of work modes based on an input signal generated by an operation of an input device, and
change a work parameter of the carrying machine and a work parameter of the loading machine based on the selected work mode,
wherein
in a case where an input operation for setting the work parameter is performed when the loading machine is performing a loading work of the ore, the management device is configured to
change the work parameter of the carrying machine without changing the work parameter of the loading machine, and
change the work parameter of the loading machine after the loading work is completed.

2. The mine management system according to claim 1, wherein
the plurality of work modes is determined in consideration of mining cost per unit weight of the ore and a mining amount of the ore per unit time, and
the management device is configured to set one work mode from among the plurality of work modes based on the input signal.

3. The mine management system according to claim 1, wherein the plurality of work modes includes at least one of a production amount valuing mode that prioritizes a production amount of the ore per unit time, an energy saving mode that prioritizes suppression of energy consumption of the carrying machine and the loading machine, and a maintenance cost saving mode that prioritizes suppression of maintenance cost of a road surface in the underground area, the loading machine, and the carrying machine.

4. The mine management system according to claim 1, wherein the work parameter of the carrying machine includes at least one of a travel speed of the carrying machine in the underground area, acceleration of the carrying machine in the underground area, a loading amount of the ore, a moving route to move to a loading area or the earth removal area, and selection of a loading area and an earth removal area to which the carrying machine heads, of a plurality of the loading areas and the earth removal areas.

5. The mine management system according to claim 1, wherein the work parameter of the loading machine includes at least one of a travel speed of the loading machine in the underground area, a loading speed of the ore to the carrying machine, and excavation force.

\* \* \* \* \*